US010263839B2

(12) United States Patent
Li et al.

(10) Patent No.: US 10,263,839 B2
(45) Date of Patent: Apr. 16, 2019

(54) REMOTE MANAGEMENT SYSTEM FOR CONFIGURING AND/OR CONTROLLING A COMPUTER NETWORK SWITCH

(71) Applicant: Fortinet, Inc., Sunnyvale, CA (US)

(72) Inventors: Jun Li, San Jose, CA (US); Ting Liu, Sunnyvale, CA (US)

(73) Assignee: Fortinet, Inc., Sunnyvale, CA (US)

( * ) Notice: Subject to any disclaimer, the term of this patent is extended or adjusted under 35 U.S.C. 154(b) by 993 days.

(21) Appl. No.: 14/214,871

(22) Filed: Mar. 15, 2014

(65) Prior Publication Data

US 2014/0280809 A1 Sep. 18, 2014

Related U.S. Application Data

(60) Provisional application No. 61/788,122, filed on Mar. 15, 2013.

(51) Int. Cl.
| | |
|---|---|
| *G06F 15/16* | (2006.01) |
| *G06F 21/00* | (2013.01) |
| *H04J 1/16* | (2006.01) |
| *H04L 12/24* | (2006.01) |
| *H04L 12/46* | (2006.01) |
| *H04L 29/06* | (2006.01) |
| *H04L 29/12* | (2006.01) |

(52) U.S. Cl.
CPC ...... *H04L 41/0806* (2013.01); *H04L 12/4641* (2013.01); *H04L 41/04* (2013.01); *H04L 41/0886* (2013.01); *H04L 63/0272* (2013.01); *H04L 61/2015* (2013.01)

(58) Field of Classification Search
CPC .................. H04L 41/0806; H04L 12/4641
USPC ......................................... 709/222
See application file for complete search history.

(56) References Cited

U.S. PATENT DOCUMENTS

| | | | | |
|---|---|---|---|---|
| 7,702,732 | B1 * | 4/2010 | Squire .................. | H04L 41/084 709/206 |
| 7,756,027 | B1 * | 7/2010 | Reddy ................. | H04L 41/0806 370/230 |
| 8,310,950 | B2 * | 11/2012 | Lofstrand ............... | G06F 9/465 370/229 |
| 9,007,945 | B2 * | 4/2015 | Nguyen ............. | H04L 41/5054 370/252 |
| 9,065,802 | B2 * | 6/2015 | May ..................... | H04L 63/0272 |
| 2002/0191548 | A1 * | 12/2002 | Ylonen ............... | H04L 63/0272 370/254 |
| 2005/0180326 | A1 * | 8/2005 | Goldflam ................ | H04L 12/12 370/231 |

(Continued)

*Primary Examiner* — Esther B. Henderson
*Assistant Examiner* — Golam Mahmud
(74) *Attorney, Agent, or Firm* — Hamilton, DeSanctis & Cha LLP

(57) ABSTRACT

Methods and systems for remotely managing a switching device are provided. According to one embodiment the existence of a firewall security device within a network is automatically determined by a discovery module of a switching device. Upon determining the existence of the firewall security device, a command channel is established with the firewall security device by a communication module of the switching device. The switching device may then receive commands issued by the firewall security device through the command channel relating to configuration of one or more Virtual Local Area Networks (VLANs).

20 Claims, 22 Drawing Sheets

(56) References Cited

U.S. PATENT DOCUMENTS

| | | | |
|---|---|---|---|
| 2006/0193300 A1* | 8/2006 | Rawat | H04L 63/1408 370/338 |
| 2007/0204005 A1* | 8/2007 | Eubanks | H04L 12/185 709/217 |
| 2010/0191829 A1* | 7/2010 | Cagenius | H04L 12/2834 709/219 |
| 2010/0325257 A1* | 12/2010 | Goel | H04L 29/12028 709/223 |
| 2011/0023090 A1* | 1/2011 | Asati | H04L 12/4633 726/4 |
| 2012/0210416 A1* | 8/2012 | Mihelich | H04L 63/0218 726/11 |
| 2012/0284374 A1* | 11/2012 | Deutsch | H04L 29/12367 709/220 |
| 2013/0298182 A1* | 11/2013 | May | H04L 63/0272 726/1 |
| 2014/0075505 A1* | 3/2014 | Subramanian | H04L 12/4641 726/3 |
| 2014/0092884 A1* | 4/2014 | Murphy | H04L 69/03 370/338 |
| 2015/0180722 A1* | 6/2015 | Kapadia | H04L 41/12 370/401 |

* cited by examiner

REMOTE MANAGEMENT SYSTEM FOR CONFIGURING AND/OR CONTROLLING A COMPUTER NETWORK SWITCH

CROSS-REFERENCE TO RELATED APPLICATIONS

This application claims the benefit of U.S. Provisional Application No. 61/788,122, filed Mar. 15, 2013, which is hereby incorporated by reference in its entirety for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2013-2014, Fortinet, Inc.

BACKGROUND

Field

Embodiments of the present invention generally relate to the field of network switches. In particular, various embodiments relate to a method and system for remote management of a computer network switch.

Description of the Related Art

The Internet includes many network nodes that are linked together such that information may be transferred among them. Examples of network nodes include routers that propagate a packet from one link to another. Packets that enter or leave a private network typically pass through a firewall. Firewalls restrict unauthorized Internet users from accessing the private networks connected to the Internet. A network may rely on multiple servers/firewalls that can work on different data packets that arrive simultaneously. The arriving packets hence can be distributed among different firewalls, connected at different network nodes. These network nodes are connected by a computer networking device such as a network switch. The network switch may be a multi-port switch that processes and routes data at layer 2 (or higher) of an Open Systems Interconnection (OSI) model. A data packet entering a port of a network switch may leave through a different port of the same network switch.

The management functions of a network switch, such as controlling, configuring, monitoring, and the like may be entered locally via a Command Line Interface (CLI), incorporated at the network switch. Such commands are processed locally by the CLI and communicated to various elements of the network switch for controlling different functions like turning ports on/off, monitoring data flow through the switch, and naming equipment etc. Generally, the CLI requires that a network administrator be physically located close to the network switch while entering control and/or configuration commands via a local user interface. In order to provide remote access, the local CLI is typically connected to communication ports, such as an RS232 port, Telnet, or the like to provide remote access using a personal computer. When it is desired to communicate commands to a number of different network switches, the network administrator has to remotely access each of the local CLI interfaces. Hence, there is a need for a centralized management system that can provide control commands to a number of switches added to the network. Moreover, there is a need for a management system that can automatically provide Virtual Local Area Networks (VLANs) to ports that are connected to the network switch.

SUMMARY

Methods and systems are described for remotely managing a switching device. According to one embodiment the existence of a firewall security device within a network is automatically determined by a discovery module of a switching device. Upon determining the existence of the firewall security device, a command channel is established with the firewall security device by a communication module of the switching device. The switching device may then receive commands issued by the firewall security device through the command channel relating to configuration of one or more Virtual Local Area Networks (VLANs).

Other features of embodiments of the present invention will be apparent from the accompanying drawings and from the detailed description that follows.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

Figure 1:
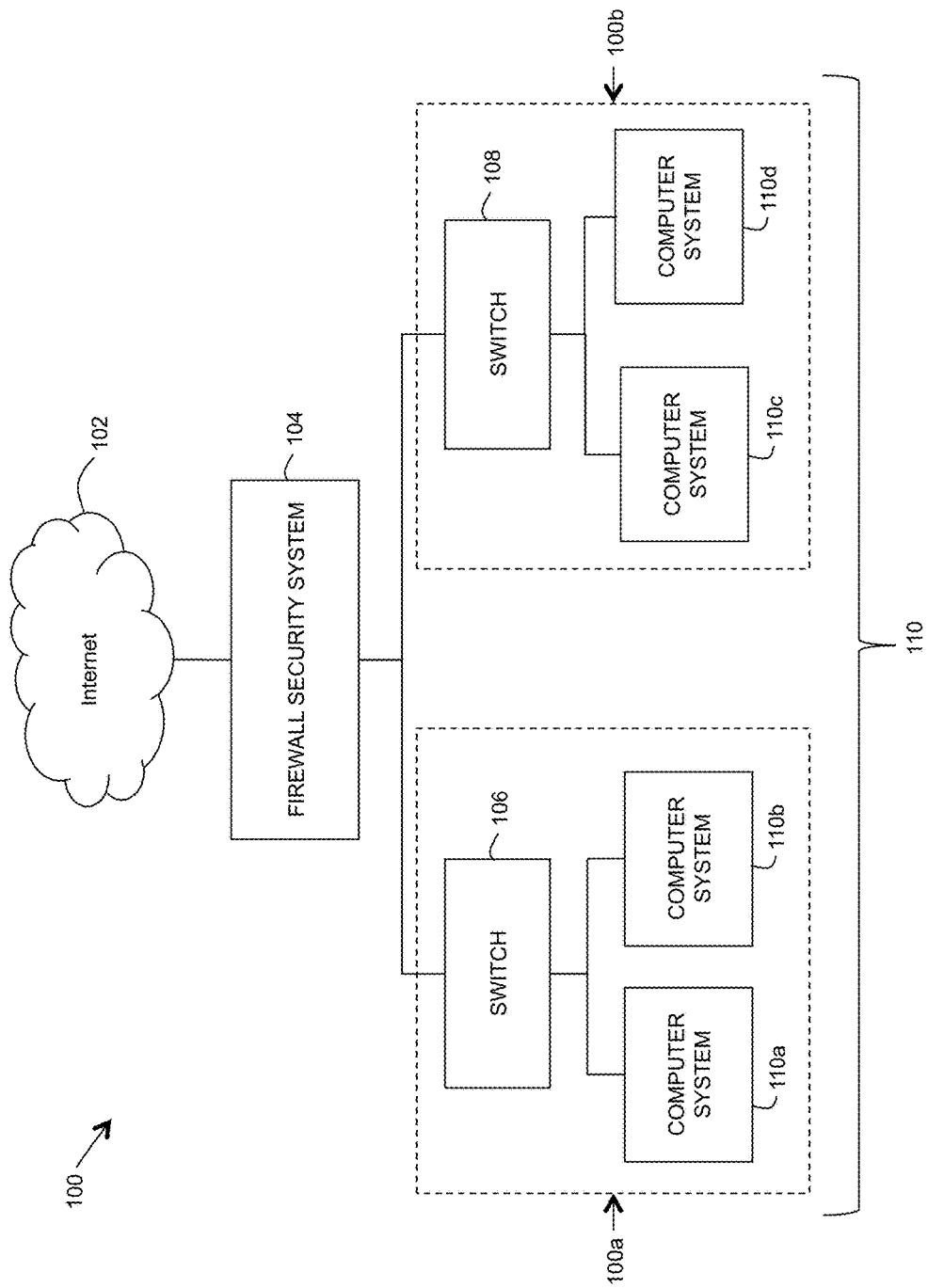
FIG. 1 is a block diagram illustrating a simplified network in which embodiments of the present invention may be employed.

Methods and systems are described for remote management of a switching device in a network. Due to the existence of multiple switches in a system, it is desirable to have a centralized management system that can provide control commands to the switches. Moreover, there is required a management system that can automatically provide VLANs to ports that are connected to the network switch, and management system/switch system will forward/route/do security checks on the traffic depending upon the configuration Hence, in light of the limitations described in the Background and the foregoing discussion, there is a need for a better remote management system of a network switch. Additionally, it would be desirable if a centralized remote management system may be used for multiple switches in a network.

According to an embodiment of the present invention, one or more Virtual Local Area Networks (VLANs) of the switching device are configured by providing a VLAN name and a VLAN ID. Further, the switching device is managed by configuring one or more ports and/or trunks. The one or more ports are further set as tagged or untagged members. In an embodiment, the switching device is configured to automatically discover a firewall security device for processing of a data packet. In another embodiment, a VLAN pool may be used to facilitate automatic configuration of VLAN settings among switching devices and the firewall security device. For example, a user can initiate configuration of VLANs and associated security policies among the security firewall device and switch devices by simply configuring an edge port of a network switch with a VLAN selected from the VLAN pool.

According to an embodiment, the method of automatic discovery of the firewall security device is selected from a group comprising of a broadcast method, a multicast method, a static Internet Protocol (IP) method, and a Dynamic Host Configuration Protocol (DHCP) method.

According to various embodiments of the present invention, the remote management system provides administrative access to view the configuration of a switching device. A technician does not have to be present in the wiring closet to change the network switch settings. Moreover the remote management system provides centralized switch control and integrates a security check between a security firewall device and a switching device. In an embodiment, when a switching device is connected to a switch controller, i.e., the remote management system, the switch controller is aware of the port that network switch is from. Hence, the controller adds all the related Virtual Local Area Networks (VLANs) in the remote management system implicitly and adds those related VLANs as members of the bridge/switch interfaces, it will create multiple virtual switches inside a firewall security device to help forwarding the traffic. Further, the present system helps a network administrator in provisioning VLANs to multiple switching devices and configuring network routing between VLANs. The administrator may configure only an edge port on a switching device with a VLAN selected from the VLAN pool. The switching device and a firewall security device can then determine the necessary setting of VLANs, and the switching device and the firewall security device will forward/route/security scan the data traffic depending upon the switch port/VLAN configuration. Hence, this allows for full automatic configuration for directly connected switching devices and firewall security devices. In another embodiment, the switching device can auto discover an available firewall security device for data processing. Depending on the server settings, the switching device automatically chooses a particular method to send a discovery request to a firewall security device. Moreover, the remote management system provides a base foundation for the switching device, making the switching device flexible. Hence, features and capabilities can continuously be added as and when required.

In the following description, numerous specific details are set forth in order to provide a thorough understanding of embodiments of the present invention. It will be apparent, however, to one skilled in the art that embodiments of the present invention may be practiced without some of these specific details. In other instances, well-known structures and devices are shown in block diagram form.

Embodiments of the present invention include various steps, which will be described below. The steps may be performed by hardware components or may be embodied in machine-executable instructions, which may be used to cause a general purpose or special-purpose processor programmed with the instructions to perform the steps. Alternatively, the steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware). Moreover, embodiments of the present invention may also be downloaded as one or more computer program products, wherein the program may be transferred from a remote computer to are questing computer by way of data signals embodied in a carrier wave or other propagation medium via a communication link (e.g., a modem or network connection).

In various embodiments, the article(s) of manufacture (e.g., the computer program products) containing the computer programming code may be used by executing the code directly from the machine-readable storage medium or by copying the code from the machine-readable storage medium into another machine-readable storage medium (e.g., a hard disk, RAM, etc.) or by transmitting the code on a network for remote execution. Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

While for sake of illustration embodiments of the present invention are described with reference to switching devices and firewall security devices available from the assignee of the present invention, it is to be understood that the methods and systems of the present invention are equally applicable to switching devices and firewall security devices that are manufactured by others, including, but not limited to, Barracuda Networks, Brocade Communications Systems, Inc., CheckPoint Software Technologies Ltd., Cisco Systems, Inc., Citrix Systems, Inc., Imperva Inc., Juniper Networks, Inc., Nokia, Palo Alto Networks, SonicWall, Inc. and Syntensia AB.

TERMINOLOGY

Brief definitions of terms used throughout this application are given below.

The term "client" generally refers to an application, program, process or device in a client/server relationship that requests information or services from another program, process or device (a server) on a network. Importantly, the terms "client" and "server" are relative since an application may be a client to one application but a server to another. The term "client" also encompasses software that makes the connection between a requesting application, program, process or device to a server possible, such as an FTP client.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

The phrases "in one embodiment," "according to one embodiment," "and the like" generally mean the particular feature, structure, or characteristic following the phrase is included in at least one embodiment of the present invention, and may be included in more than one embodiment of the present invention. Importantly, such phrases do not necessarily refer to the same embodiment.

The phrase "network device" generally refers to a device that is used to facilitate communications among computers or other electronic devices within a communication network or between communications networks and/or communicatively couple such computers or other electronic devices together so that they can, among other things, share files or resources. A network device may receive data from an adjoining network device or a source, and may transmit the data to another adjoining network device or a destination. Examples of network devices include, but are not limited to, switches, hubs, routers, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

If the specification states a component or feature "may", "can", "could", or "might" be included or have a characteristic, that particular component or feature is not required to be included or have the characteristic.

The term "server" generally refers to an application, program, process or device in a client/server relationship that responds to requests for information or services by another program, process or device (a server) on a network. The term "server" also encompasses software that makes the act of serving information or providing services possible.

The term "firewall security device" generally refers to a logical or physical network device that provides firewall security functionality by implementing various firewall policies; however, a firewall security device is not limited to performing firewall security functionality and may perform other content processing functions, including, but not limited to scanning/processing of web (HTTP), file transfer (FTP), and email (SMTP, POP3, and IMAP), antivirus processing, intrusion prevention and hardware acceleration. In some embodiments, the firewall security devices are specialized processing blades installed within a chassis, such as a sophisticated Ethernet switching device. In some embodiments, a physical device (e.g., a processing blade) may include multiple virtual systems that operate as firewall security devices.

The term "switching device" generally refers to a network device that functions as a multi-port bridge. For example, a switching device may be an active element working on layer 2 of the Open Systems Interconnection (OSI) model. Switching devices may use filtering/switching techniques that redirect data flow to a particular firewall security device, based on certain elements or information found in network traffic data packets. In one embodiment, a switching device distributes network traffic data packets among its ports (and associated firewall security devices) depending upon the content, elements or information associated with the packet and/or packet header, including, but not limited to a source or destination address, a source or destination port and the like.

FIG. 1 is a block diagram illustrating a simplified network 100 in which embodiments of the present invention may be employed. Network 100 may represent a private or public network, such as a Local Area Network (LAN), a Wireless LAN (WLAN) coupled to the Internet 102. In the present example, network 100 includes a firewall security system 104, a switching device 106 (which hereinafter maybe referred to simply as a switch), a switching device 108, and one or more computer systems 110*a*-*d*.

According to one embodiment, security firewall device 104 operates as a central management device for switching devices 106 and 108. Switching devices 106 and 108 are configured as interface extensions of security firewall device 104. In this manner, switching device 106 and 108 act as remote extensions and wired access points of security firewall device 104, and the switch ports on switching devices 106 and 108 can be also setup as virtual switches in the security device. In one embodiment, a virtual switch implemented within the firewall security system 104 can offload traffic to switching devices 106 and/or 108.

The network 100 may also include other network devices, including, but not limited to, routers. Routers are devices that forward data packets from one network to another. In one embodiment, router forwards data packets from network 100*a* to network 100*b*.

According to various embodiments of the present invention, firewall security system 104 is used to protect network 100*a* and network 100*b*, respectively, from unauthorized access while permitting legitimate communication to pass. Firewall security system 104 adds a level of protection between computer systems 110*a*-*d* and the Internet 102, and permits or denies network transmissions based upon a set of rules. Further, firewall security system 104 helps to prevent viruses and worms from entering computer systems 110*a*-*d* and hence protects the computer systems from threats. Firewall security system 104 may further implement firewall policies to control what users of computer systems 110-*d* have access to.

According to various embodiments of the present invention, firewall security system 104 (i) provides gateway defenses; (ii) carries out defined security policies; (iii) hides and protects internal network addresses; (iv) reports on threats and activity; and (v) segregates activity between a trusted network, and the Internet.

Referring to FIG. 1, firewall security system 104 is connected to switches 106 and 108. In an embodiment, switch 106 and switch 108 may comprise a network switch or Ethernet switch. A network switch is a computer networking device that connects various segments of network 100. Further, in operation, switch 106 and switch 108 (collectively known as network switches) may process and route data at the data link layer, i.e., layer 2 of the Open Systems Interconnection (OSI) model. In an embodiment, network switches may process data at the network layer, i.e., layer 3 of the OSI model. Alternatively, network switches may represent a multi-layer switch and operate at multiple layers of the OSI model.

In an embodiment, switch 106 is capable of channeling incoming data from computer systems 110*a*-*b* to a specific output port of switch 106 that will take the data packets to an intended destination. Similarly, switch 108 is capable of channeling incoming data from computer systems 110*c*-*d* to a specific output port of switch 108 that will take the data packets to an intended destination. In an embodiment operable within an Ethernet LAN, switches 106 and 108 determine from a destination address in each incoming data packet, which device the data packet is intended for and switches it out toward that device.

Referring to FIG. 1, switch 106 and switch 108 are connected to computer systems 110*a*-*d*. Though in FIG. 1, for the sake of illustration, four computer systems 110*a*-*d* are shown, network 100 can have more or fewer computer systems. In an embodiment, computer systems 110*a*-*d* are connected in a Virtual Local Area Network (VLAN). In an embodiment, network 100*a* represents a first VLAN (i.e., VLAN1) and network 100*b* represents a second VLAN (i.e., VLAN2). A VLAN is a group of hosts with a common set of requirements that communicate as if they are attached to the same broadcast domain, irrespective of their physical location. The VLAN has the same attributes of a physical LAN, but allows for the network nodes to be grouped together even if they are not located on the same network switch.

It will be apparent to a person ordinarily skilled in the art that computer systems 110*a*-*d* may also be connected in other network configurations without deviating from the scope of the present invention.

In an embodiment, computer systems 110*a*-*d* are configured to work as client devices. In another embodiment, computer systems 110*a*-*d* are configured to work as server computers. In still another embodiment, computer systems 110*a*-*d* may comprise a combination of client devices and server computers. According to various embodiments of the present invention, computer systems 110*a*-*d* may serve as a data center to house telecommunications and storage systems. The data center may include backup power supplies, data communications connections, environmental controls and security devices. Examples of computer systems 110*a*-*d* include desktop computers, laptops, notebook computers, handheld devices, such as mobile phones, smartphones, palm-top computers, Personal Digital Assistants (PDAs), navigational units and so forth. Various applications maybe run on computer systems 110*a*-*d*. Examples of the applications include, but are not limited to, web browsers, software applications, email applications and chat applications.

In an embodiment, one or more computer systems 110*a*-*d* may be configured by an administrator to function as an administrator console for remotely managing/controlling the firewall security system 104 (also known as a Gateway). In an embodiment, a web-based manager may be installed in one of the computer systems, for example computer system 110*a*, that can be used to deploy configuration information to the network switches 106 and 108. The web-based manager may use a Hypertext Transfer Protocol (HTTP) or HTTP Secure (HTTPS) connection from the computer system 110*a* to configure and manage switch 106. Further, the web-based manager may also support multiple languages. Furthermore, the computer system 110*a* may also include a communication port, such as RS232, Telnet or the like, to provide remote access.

It should be noted that, for sake of illustration, in the above embodiment, one of the computer systems 110*a*-*d* is configured to work as an administrator console. However, it will be apparent to a person ordinarily skilled in the art that even an external client device may be configured with the gateway to deploy managing/configuring commands.

In an embodiment, the network switch, for example switch 106, is capable of automatically locating an available firewall security device (e.g., example firewall security system 104). As explained further below with reference to FIG. 3, switch 106 may use one of multiple methods, such as a broadcast method, a multicast method, a static IP method, and a Dynamic Host Configuration Protocol (DHCP) method, to discover firewall security system 104. Once discovery is completed, the switch 106 and the firewall security system 104 initialize a command channel for remote control operations. In an embodiment, the command channel is a Control and Provisioning of Unified Termination Points (CAPUTP) command channel, a Control and Provisioning of Wireless Access Points (CAPWAP) command channel or the like. However, other types of command channels may also be employed. When the command channel between the switch 106 and the firewall security system 104 is established, the firewall security system 104 may issue remote commands directly to switch 106. Switch 106 then processes the commands and delivers any requested information back to firewall security system 104. After the command channel has been created, an uplink data traffic (port direct-connect or trunk) is be created between firewall security system 104 and switch device 106 or switch device 108 and data traffic will be sent between security firewall device 104 and switch device 106 or switch device 108.

In an exemplary embodiment of the present invention, firewall security system 104 may be a FORTIGATE security platform and switch 106 and switch 108 may be a FORTISWITCH switching platform available from Fortinet, Inc. of Sunnyvale, Calif. (FORTIGATE and FORTISWITCH are trademarks or registered trademarks of Fortinet, Inc.).

Figure 2:
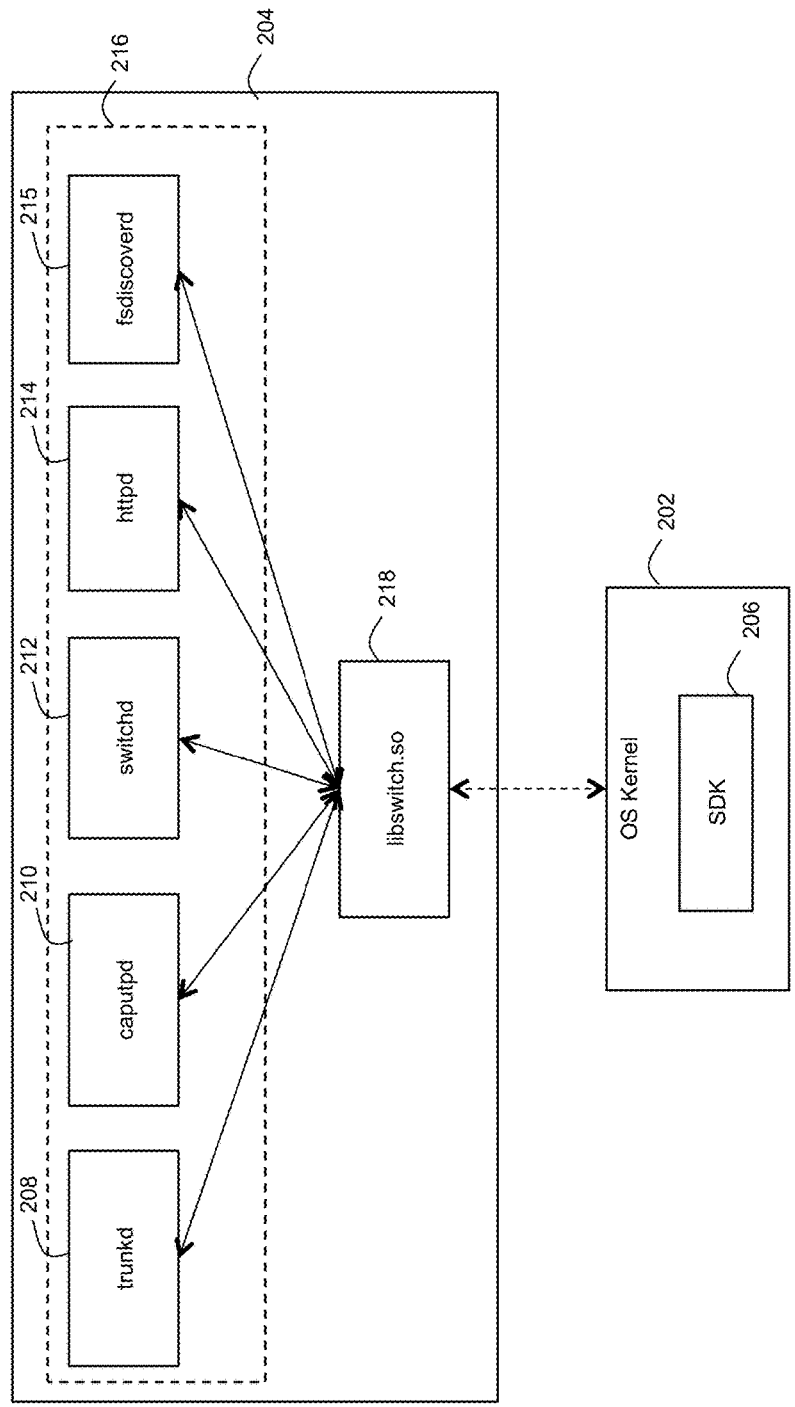
FIG. 2 is a block diagram conceptually illustrating a software architecture of a switch according to an embodiment of the present invention.

FIG. 2 is a block diagram conceptually illustrating a software architecture of a network switch, such as switch 106, according to an embodiment of the present invention. In an embodiment, switch 106 supports various features such as VLAN tagging, Spanning Tree Protocol (STP), Media Access Control (MAC) bridging, Multiple STP, Link Aggregation (LAG), and flow control. These features of switch 106 are described as below:

Link Aggregation/Trunking: Trunking is a method of combining multiple network connections in parallel to increase network throughput, and to provide redundancy in case one of the link fails. In one embodiment, the connections may be combined such that multiple interfaces share one logical address (e.g., MAC or IP). In another embodiment, connections may be combined such that each interface has its own address.

VLAN Tagging: When VLANs span multiple network switches, VLAN tagging is required. A VLAN is a local area network that helps administrators to create logical network connectivity in a physical connectivity. VLAN tagging is a method of inserting VLAN identification (ID) into a data packet header in order to identify which VLAN, the data packet belongs to when it traverses multiple switches. More specifically, the different network switches use this information, i.e., the VLAN ID, to determine which ports/interfaces to send a broadcast data packet to. Hence, when a data packet is forwarded between multiple switches, a forwarding switch determines which VLAN the data packet belongs to (through a switch port to VLAN mapping/configuration), and inserts the VLAN ID into the packet header. When a receiving switch receives the tagged packet, it forwards the data packet to the port(s) corresponding to that VLAN ID.

VLAN Trunking Protocol (VTP): VTP carries VLAN information to all network switches in a VTP domain; hence it maintains VLAN configuration consistency across an entire network. VTP uses layer 2 trunk frames to manage the addition, deletion and renaming of VLANs on a network-wide basis from a centralized switch. It also synchronizes VLAN information within a VTP domain and reduces the need to configure the same VLAN information on each network switch. When VLANs are spread across multiple network switches, a trunk data link is required between the switches. By enabling VLAN trunking, all data packets are accepted, irrespective of their VLAN tag, and are passed from one interface to the other with the original tag preserved. Hence, if a data packet arrives at one interface with a VLAN tag, the tag remains when it is forwarded out of another interface.

Spanning Tree Protocol (STP): STP is a link management protocol that provides path redundancy while preventing undesirable loops in a network. For an Ethernet network to function properly, only one active path should exist between two network nodes. A spanning tree allows a network to include spare links to provide automatic backup paths if an active link fails, without the need for manual enabling/disabling of these backup links. STP allows bridges to exchange information so that only one of them handles a given message that is being sent between two computer systems in a network. A STP uses Bridge Protocol Data Units (BPDUs) to elect a root switch and a root port for a switched network.

Multiple Spanning Tree Protocol (MSTP): MSTP configures a separate spanning tree for each VLAN group in a network and blocks all but one of possible alternate paths within each spanning tree.

Flow Control: It is a mechanism for temporarily stopping the transmission of data when a sending computer system may be transmitting data faster than the other end of the link can accept.

Software Development Kit (SDK): SDK is a set of software development tools that helps in creating a software package, software framework, hardware platform and the like. It is an Application Programming Interface (API), in the form of files to interface to a particular programming language.

Referring to FIG. 2, switch 106 comprises a kernel space 202 and a user space 204. Kernel space 202 is a virtual memory of switch 106 where the core of its operating system executes and provides its services. In an embodiment, kernel space 202 is reserved for running the operating system, extensions of the operating system, and most switches drivers.

User space 204 is virtual memory segment of switch 106 in which all user mode applications work and can be swapped out when required. For example, the contents of memory comprising dedicated Random Access Memory (RAM), Very Large Scale Integrated Circuit (VLSI) semiconductor chips are stored in user space and can be accessed at extremely high speeds but are retained only temporarily.

Referring to FIG. 2, kernel space 202 comprises an SDK 206. In an embodiment SDK 206 is a Broadcom SDK. In another embodiment SDK 206 may reside in user space 204.

User space 204 comprises functional blocks of switch 106 such as a trunk daemon (trunkd) 208, a CAPUTP daemon (caputpd) 210, a switch daemon (switchd) 212, a Hypertext Transfer Protocol daemon (httpd) 214 and a firewall security device discovery daemon (fsdiscoverd) 215 collectively known as user space daemons 216. In an embodiment user space daemons 216 may communicate into kernel space 202 to carry out their operations.

According to one embodiment, packet processing of switch 106 is performed inside the kernel space 202. A library structure 218 is provided as an access mechanism that provides abstraction and ease of use for all user daemons 216. In an embodiment, kernel space 202 interacts with the functional blocks of user space 204 through library structure 218.

Figure 3:
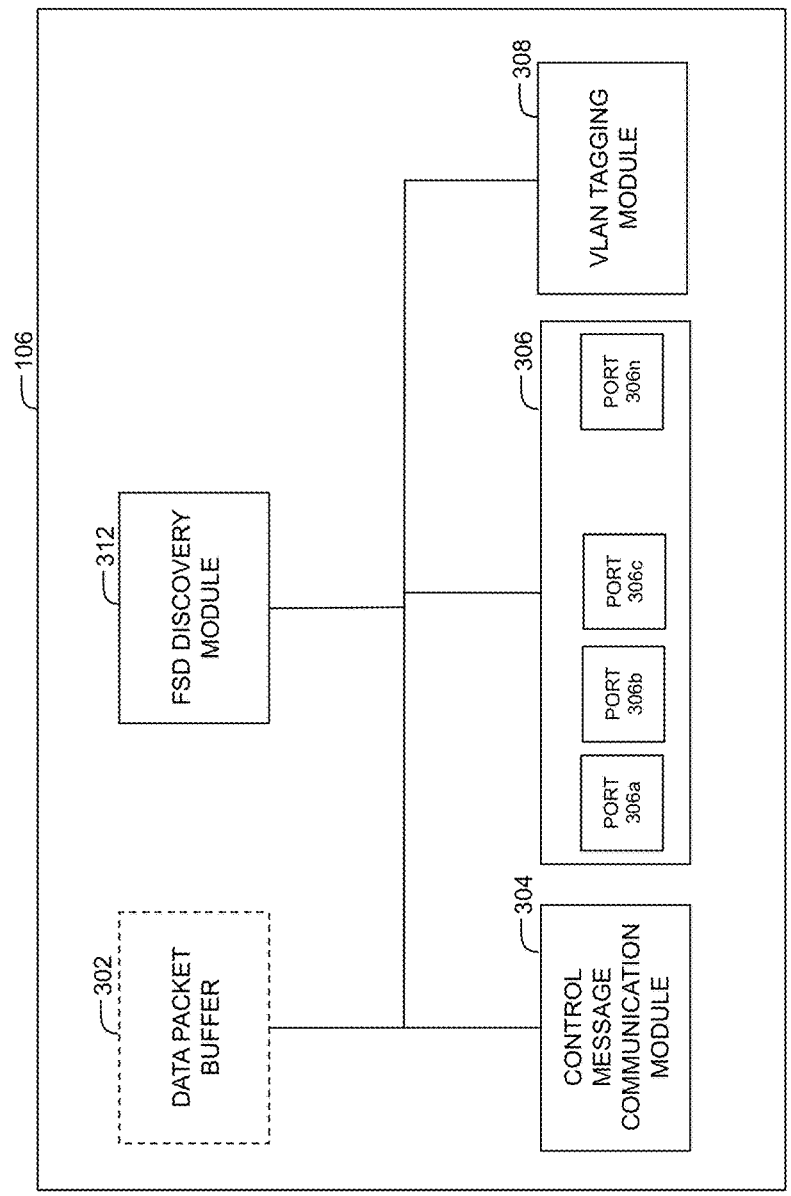
FIG. 3 is a block diagram conceptually illustrating interaction among various functional units of a switching device in accordance with an embodiment of the present invention.

FIG. 3 is a block diagram conceptually illustrating interaction among various functional units of a switching device, such as switching device 106, in accordance with an embodiment of the present invention. Switching device 106 includes an optional data packet buffer 302, a control message communication module 304 (e.g., CAPWAP, CAPUTP or the like), one or more ports 306, a VLAN tagging module 308, and a firewall security device discovery module 312. In the context of the present example, the one or more ports 306 include ports 306a-n.

According to one embodiment, when switch 106 is configured in remote management mode, Discovery Module 312 sends out discovery messages and establishes a security command channel with the discovered firewall security device (e.g., firewall security system 104) over which the firewall security device may issue port configuration to control message communication module 304 to configure the one or more ports, such as ports 306a-n. Further, in another embodiment of the present invention, switch may be configured to recognize two or more separate VLANs, where each port 306a-n is coupled to a network device or end point (e.g., computer system 110a or 110b) that belongs to the defined VLANs. In an embodiment of the present invention, one or more of ports 306a-n may form a link aggregation group (LAG). In accordance with the VLAN configuration received from firewall security device 104, VLAN tagging module 308 assigns corresponding VLAN identifiers (IDs) to packets received on ports 306a-n.

Data packet buffer 302 receives a data packet sent by one or more computer systems such as computer system 110a. The data packet may represent a request for accessing information from one or more computer systems 110. Discovery module 312 may perform discovery processing prior to or responsive to receiving data packets from connected end points. In one embodiment, discovery module 312 discovers an available firewall security device, such as firewall security device 104, for processing of data received from the data packet buffer 302. In an embodiment of the present invention, discovery module 312 may use one of the following methods to locate firewall security device 104:

Broadcast: When the network switch 106 and the firewall security device 104 are in the same broadcast domain, switch 106 sends a Discovery request message addressed to a broadcast address onto the network 100. The firewall security device 104 replies to the network switch 106 with a discovery response message in the form of a unicast packet.

Multicast: in another embodiment, when the network switch 106 and the firewall security device 104 are in the same broadcast domain, switch 106 sends a discovery request message in the form of a multicast packet. The firewall security device 104 replies to the switch 106 with a discovery response message in the form of a unicast packet.

Static IP: In an embodiment, when the network switch 106 and the firewall security device 104 are not in the same subnet, broadcast and multicast packets may not reach firewall security device 104. A network administrator may then specify the IP address of the firewall security device 104 on switch 106. Switch 106 then sends a discovery request message in the form of a unicast packet to the firewall security device 104 by addressing it to the configured IP address.

DHCP: An administrator pre-configures the IP address of the firewall security device 104 on a DHCP server. The network switch 106 initiates a DHCP request. When this request is received by the DHCP server, the server sends a response with a specific option including the controller's (firewall security device 104) IP address. The network switch 106 then sends a discovery request message to this address in the form of a unicast packet.

When the discovery of the firewall security device 104 is completed by the discovery module 312, switch 106 and the firewall security device 104 may initialize a command channel for remote control operations. In an embodiment, the control message communication module 304 may initialize a CAPUTP, CAPWAP or the like command channel for remote control operations. Once the command channel is established, the firewall security device 104 may issue remote commands directly to the switch 106.

In an embodiment, the control message communication module 304 initializes a CAPUTP, CAPWAP or the like command channel for remote control operations. For example, CAPUTP provides an encrypted master-slave channel where the firewall security device 104 issues remote commands directly to switch 106. Switch 106 then processes the command and delivers any requested information back to the firewall security device 104.

In an embodiment, ports 306a-n include one or more communication ports. Examples of communication ports include, but are not limited to, an RS232 port, Telnet and a Secure Shell (SSH) connection. The communication port provides remote access to switch 106 using a firewall security device (e.g., firewall security system 104) or a personal computer, such as computer system 110a.

In one embodiment of the present invention, the functionality of one or more of the above-referenced functional units may be merged in various combinations. For example, data packet buffer 302 may be incorporated within VLAN tagging module 308 or control message communication module 304 may be incorporated within discovery module 312. Moreover, the functional units can be communicatively coupled using any suitable communication method (e.g., message passing, parameter passing, and/or signals through one or more communication paths etc.). Additionally, the functional units can be physically connected according to any suitable interconnection architecture (e.g., fully connected, hypercube, etc.). In an exemplary embodiment of the present invention, one or more of the above-referenced functional units may be implemented in a content aware processor, which may comprise a content addressable memory (CAM), such as a ternary CAM (TCAM).

According to various embodiments of the present invention, the functional modules can be any suitable type of logic (e.g., digital logic) for executing the operations described herein. Any of the functional modules used in conjunction with embodiments of the present invention can include machine-readable media including instructions for performing operations described herein. Machine-readable media include any mechanism that provides (i.e., stores and/or transmits) information in a form readable by a machine (e.g., a computer). For example, a machine-readable medium includes read only memory (ROM), random access memory (RAM), magnetic disk storage media, optical storage media, flash memory devices, electrical, optical, acoustical or other forms of propagated signals (e.g., carrier waves, infrared signals, digital signals, etc.), etc.

Figure 4:
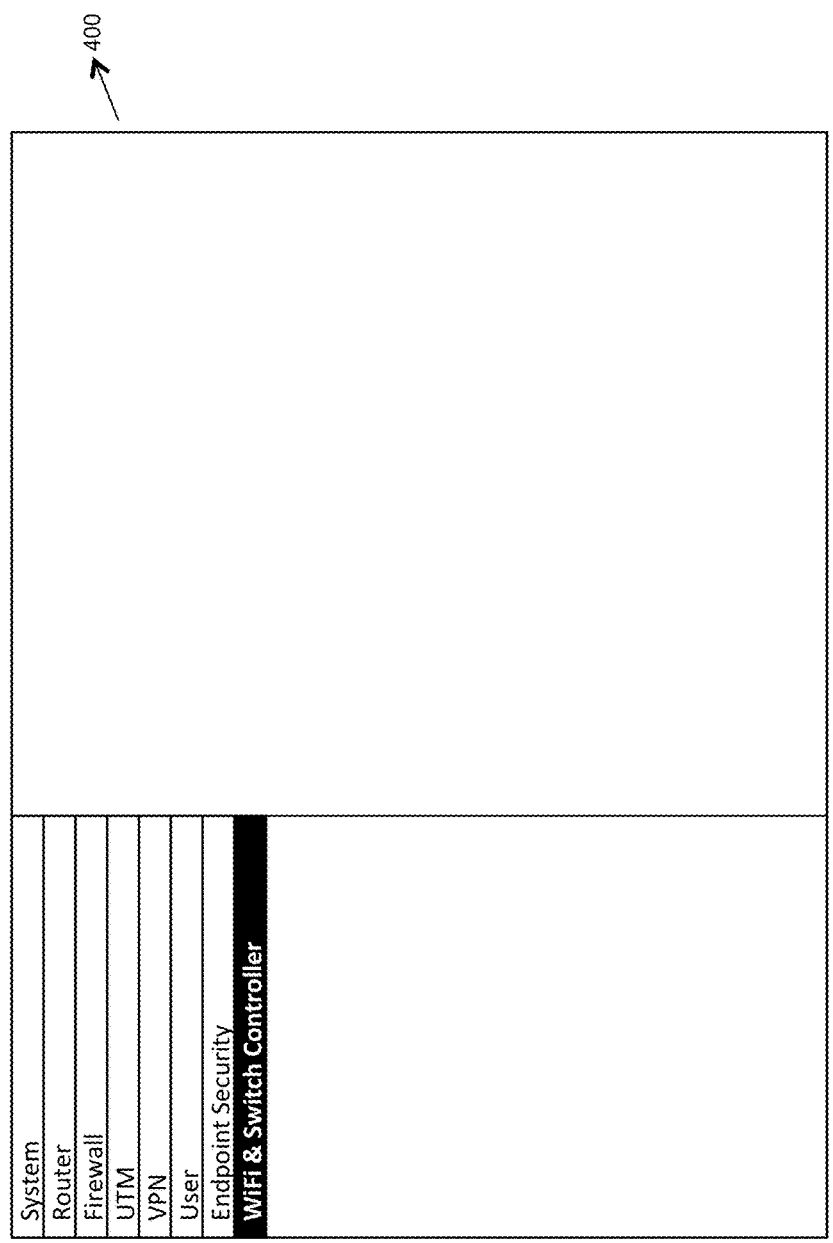
FIG. 4 shows a menu layout for a remote management system of a network switch in accordance with an embodiment of the present invention.

FIG. 4 shows an exemplary menu layout for a remote management system of a network switch, such as switch 106, in accordance with an embodiment of the present invention. The features and network properties of switch 106 may be configured and/or controlled remotely via the firewall security system 104 (also known as a gateway/controller) by a Command Line Interface (CLI) and/or a Graphical User Interface (GUI). A CLI mechanism is used for interacting with an operating system by typing commands to perform specific tasks. A CLI is typically a text-only interface through which an administrator enters a command for instructing the computer to perform a task. A command-line interpreter then receives, parses and executes the requested command. Upon completion, the CLI returns an output to the user in the form of text lines. This output may be an answer if the command is a question, or the output may be a summary of the operation or results of the operation. In order to provide remote access, a local CLI may be connected to a communication port of the network switch.

A GUI is an interface that allows users to interact with electronic devices through direct manipulation of graphical elements. A GUI typically represents the information and actions available to the user through graphical icons and visual indicators.

In an embodiment, a remote management system for network 100 is CLI based. In another embodiment, remote management system for switch 106 is GUI based. In still another embodiment, both CLI and GUI based remote management systems are provided for network 100.

FIG. 4 represents a GUI 400 for switch 106. In the present example, GUI 400 represents an interface of a remote management system that includes the items in its menu layout that can be controlled and/or configured via the remote management system. In an embodiment GUI 400 is a web-based manager that uses Hypertext Transfer Protocol (HTTP) or HTTP Secure (HTTPS) connection from a computer system to configure and manage the switch 106, and supports multiple languages.

The options available at this level of the GUI 400 include features/functions/configurations/options relating to: System, Router, Firewall, Unified Threat Management (UTM), Virtual Private Network (VPN), User, Endpoint Security, and Wireless and Switch Controller (also represented as WiFi & Switch Controller).

Figure 5:
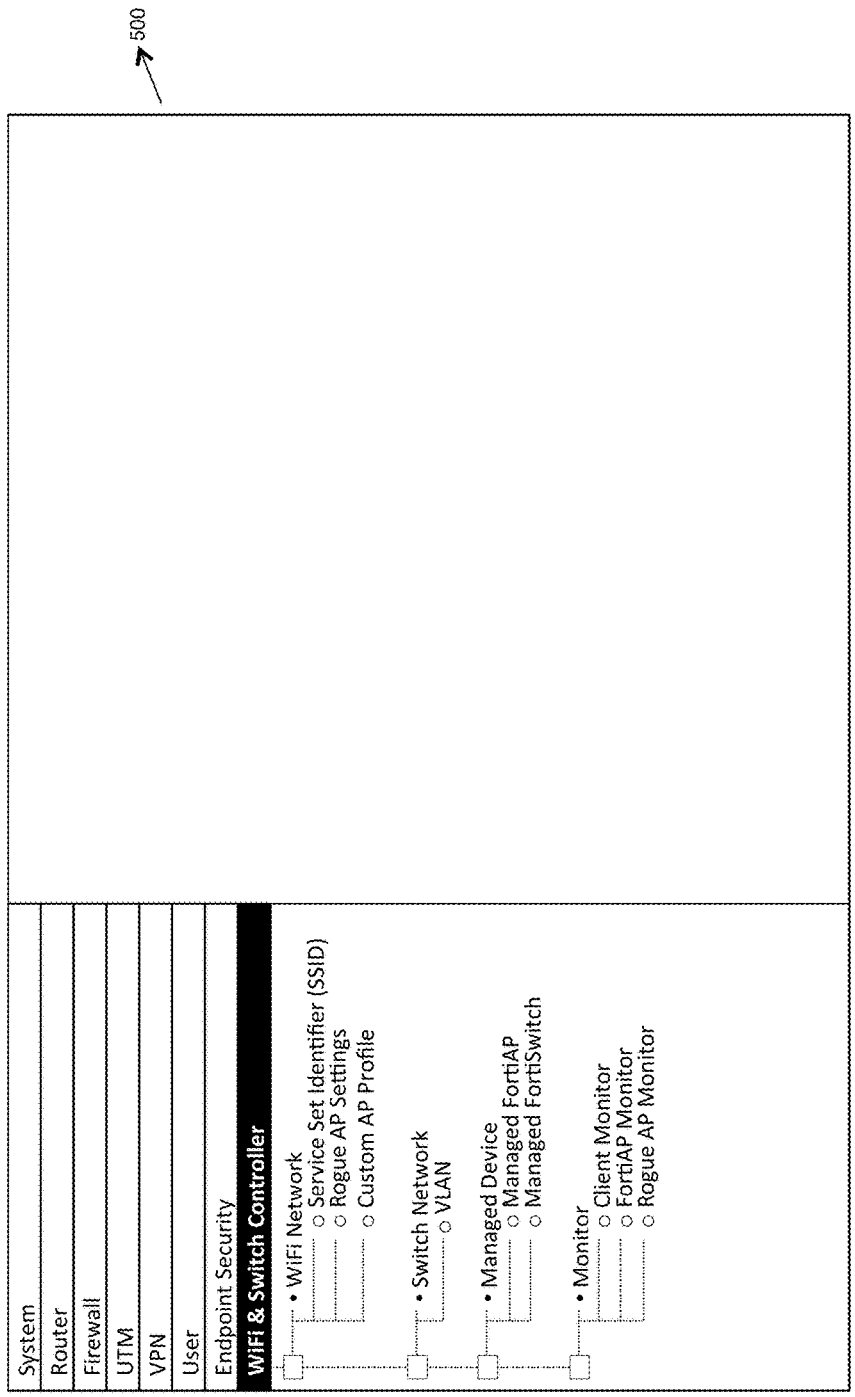
FIG. 5 shows an expanded menu layout of Wireless and Switch Controller tab of a remote management system in accordance with an embodiment of the present invention.

FIG. 5 shows an expanded menu layout 500 of a Wireless and Switch Controller tab of a remote management system, in accordance with an embodiment of the present invention. Wireless and Switch Controller comprises sub-levels and their further branches. In an embodiment, as shown in FIG. 5, the menu layout of the Wireless and Switch Controller is as follows (the indentation represents sub-levels of the parent branch):

WiFi & Switch Controller
    WiFi Network
    Service Set Identifier (SSID)
    Rogue Access Point (AP)
    Custom AP Profile
    Switch Network
    Virtual Switch
    Managed Device
    Managed FortiAP
    Managed FortiSwtich
    Monitor
    Client Monitor
    FortiAP Monitor
    Rogue AP Monitor It will be apparent to a person ordinarily skilled in the art that the above menu layout is just exemplary and modifications may be made, without deviating from the scope of the invention.

In another embodiment, a page for Switch Monitors may be included under the Monitor tab to view switch status, active users and devices connected to switch ports.

Figure 6A:
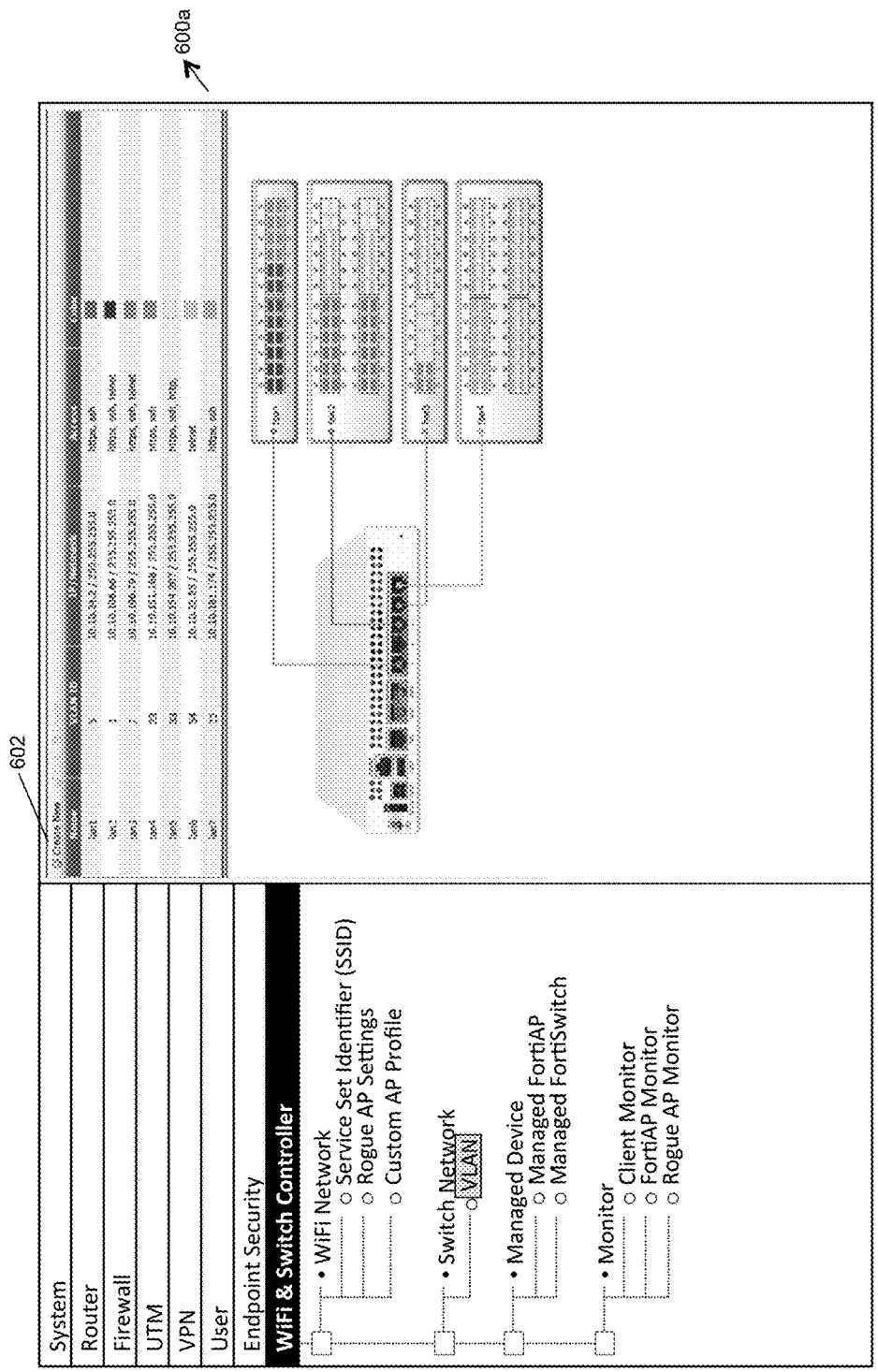
FIGS. 6A-6D collectively show a GUI for creating and/or editing VLANs for network switches, according to an embodiment of the present invention.
Figure 6B:
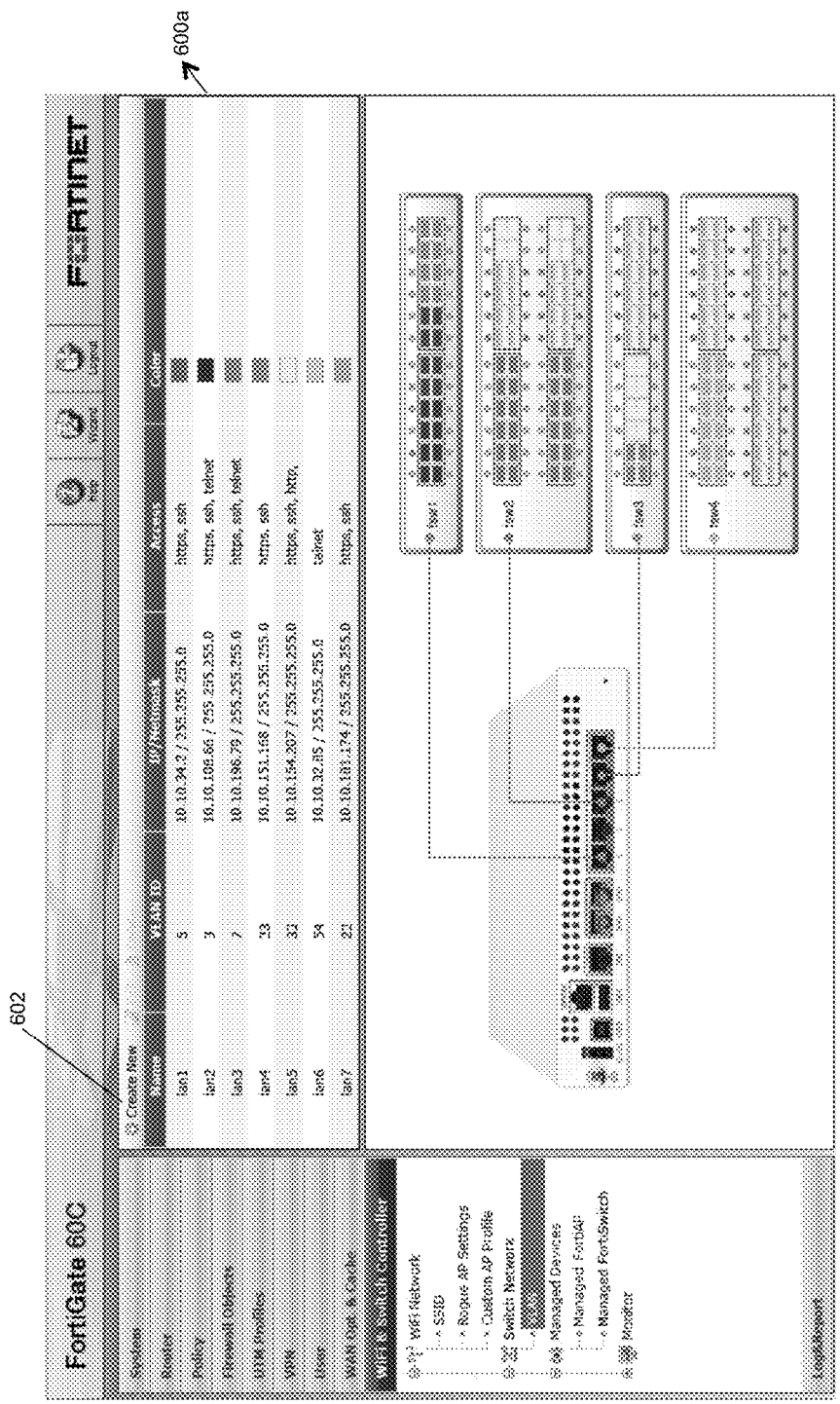

FIGS. 6A-6D shows a GUI 600a for creating and editing VLANs for a network switch, according to an embodiment of the present invention. When a user clicks on
Switch Network→VLAN→Configuration,
the display screen shows existing VLAN Names and VLAN identifiers (ID) in the network. For example, as shown in FIGS. 6A and 6B, existing VLANs named "lan1," "lan2," "lan3," "lan4," "lan5," "lan6" and "lan7" are displayed on the screen. The VLAN named "lan1" has a VLAN ID of 5, whereas the VLAN named "lan2" has VLAN ID of 3 and so on. The interface also has a create button 602 for creating a new VLAN.

In an embodiment, when a user clicks on the create button, a new page is displayed. In an embodiment, the new page is a dialog box similar to display 600b of FIGS. 6C and 6D. The dialog box prompts the user to input various parameters to configure the features of a new VLAN that is being created. The various parameters that may be included for creating a new VLAN are Interface Name, VLAN ID, Enable Dynamic Host Configuration Protocol (DHCP), Address Range, Netmask, Default Gateway, Domain Name System (DNS) Server, and security mode of this VLAN (e.g., captive portal and 802.1x), Comments and the like. Various values are entered depending on the configuration requirement.

Figure 6C:
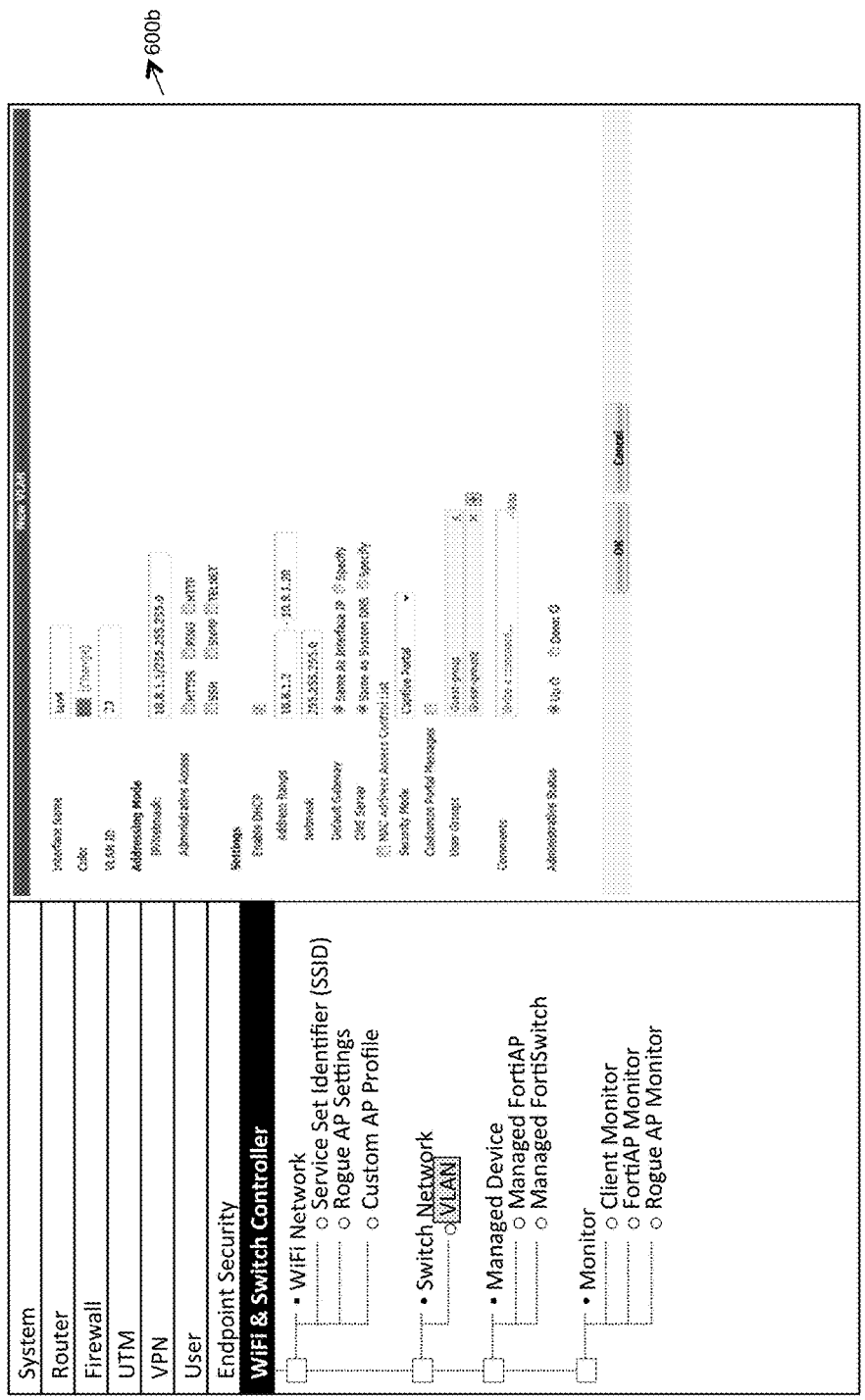
Figure 6D:
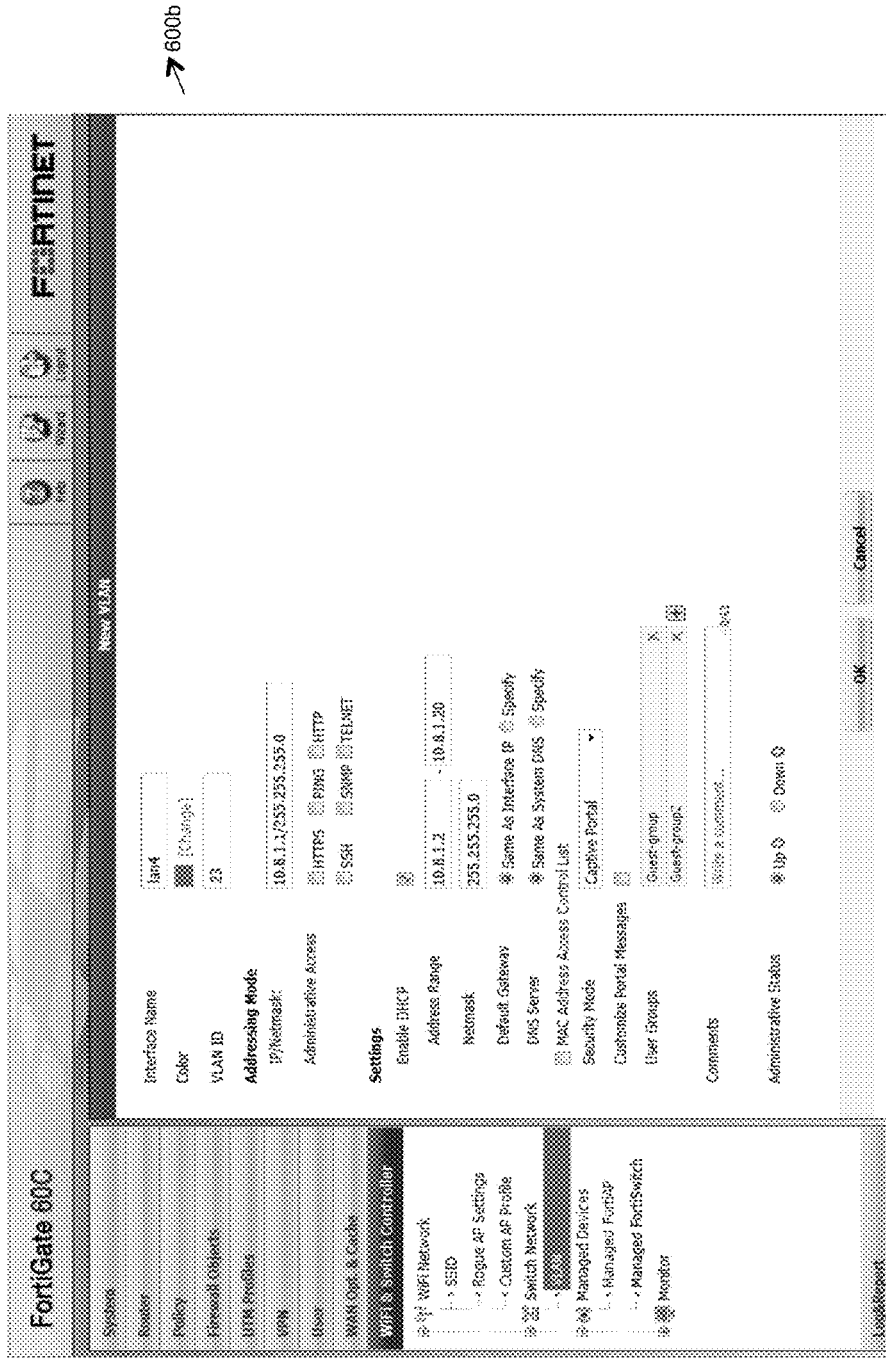

It should be noted that values entered in FIGS. 6C and 6D are merely exemplary, and other parameter values may be entered depending upon the particular implementation. Further, the parameters of the dialog box stated above are exemplary and various fields may be entered or deleted without deviating from the scope of the invention. For example, all the switch chassis faceplates that connect to current security firewall device may be shown and all the interfaces/ports may be color coded to allow the user to more easily differentiate among VLANs.

Once a new VLAN has been created using the create button, the new VLAN is displayed on GUI 600a, in the list of VLANs. In an embodiment, the new VLAN is created as a bridge/switch interface. When a switch, for example switch 106, joins the remote management system, the remote management system knows the port the switch 106 is from and the remote management system adds related VLANs in the switch 106 implicitly and also adds the related VLANs as members of bridge/switch interfaces. Hence, the intra-VLAN traffic may be directed to the related VLANs, and the out-VLAN traffic may be passed by routing/firewall to other VLANs.

Apart from creating a new VLAN, GUI 600a may also be used to edit, delete or refresh a VLAN from the list of VLANs.

In an embodiment, the CLI syntax for creating a new VLAN is

| Config switch-controller vlan |
| --- |
| Edit [vlan-name] |
| Set vlan-id [integer] |
| Set comments [. . .] |
| end |

In an embodiment, when a VLAN is considered reachable, the firewall security device leverages knowledge of the subnets (via DHCP configuration) to configure routing between the VLANs. In another embodiment, when the DHCP is not enabled, the firewall security device uses a manual configuration.

Figure 7A:
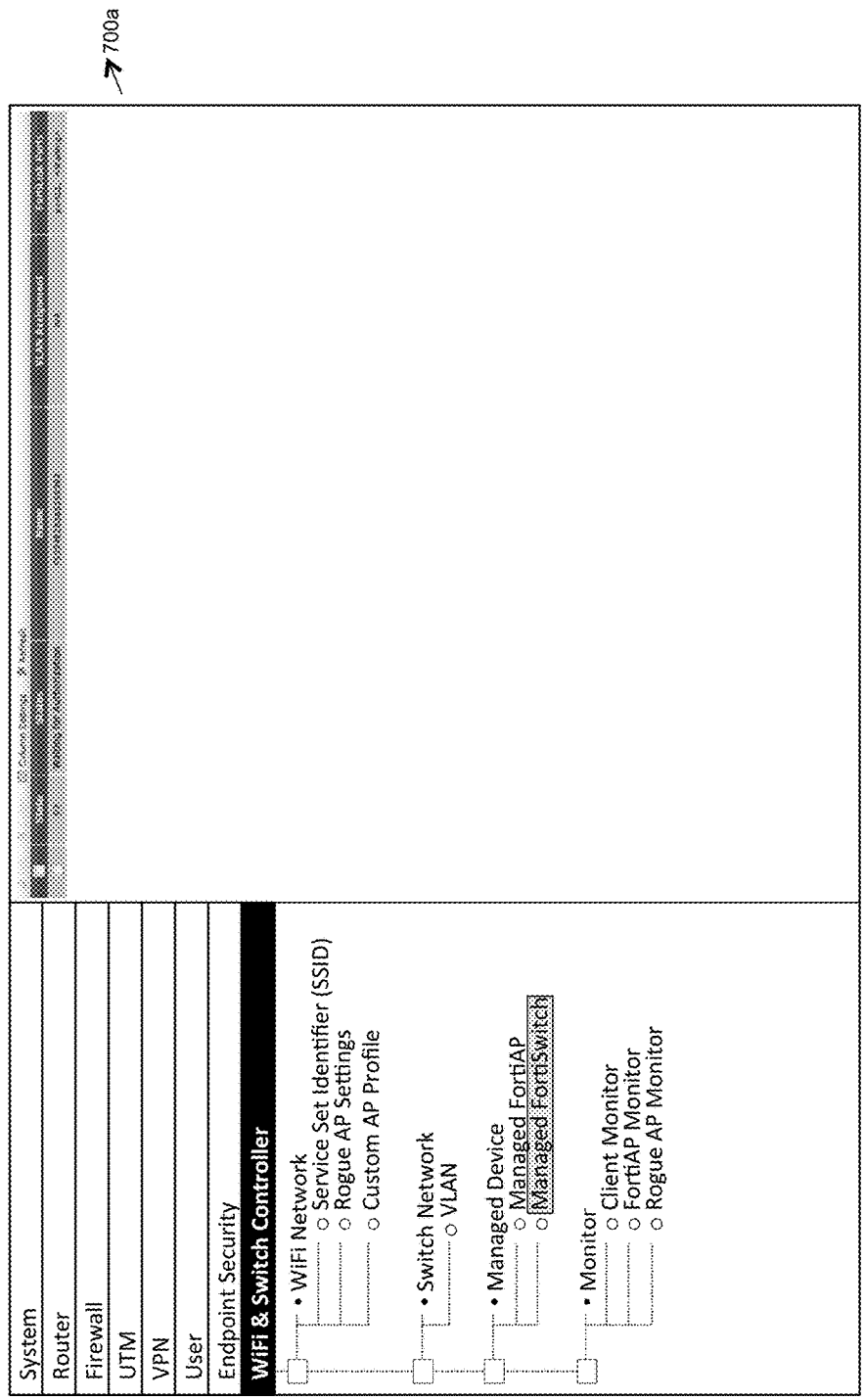
FIGS. 7A-7D collectively illustrate an interface for managing a network switch according to an embodiment of the present invention.
Figure 7B:
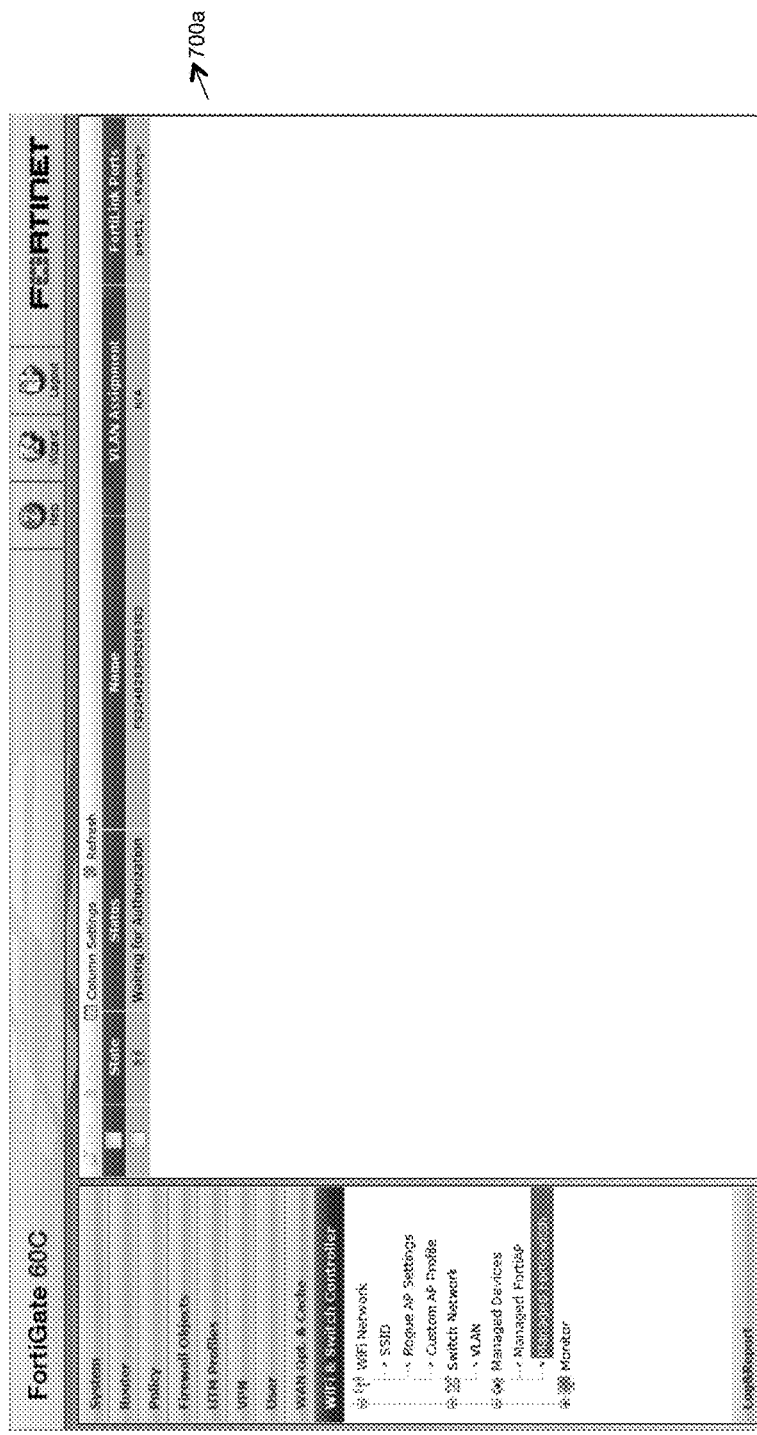

FIGS. 7A-7D collectively illustrate an interface for managing a network switch, such as switch 106, according to an embodiment of the present invention. When in the remote management system, if a user clicks on Wireless and Switch Controller→Managed Device→Managed Switch, an interface similar to FIGS. 7A and 7B is displayed. The interface comprises a list of all network switches connected to the remote management system that are being managed by the remote management system. For example, FIG. 7A shows a list containing one network switch. In an embodiment, the list comprises various switch parameters such as a State of the switch, a Name of the switch, a Serial Number of the switch, a Firmware Version currently installed on the switch, VLAN assignment information and information regarding a FortiLink Port.

FIGS. 7A and 7B show exemplary values of these parameters. A user may select any one of the switches from the list of switches and perform various functions such as Edit, Delete, Column Settings, and Refresh. When the user selects to perform any one of these functions, a page similar to FIGS. 7C and 7D is displayed.

Figure 7C:
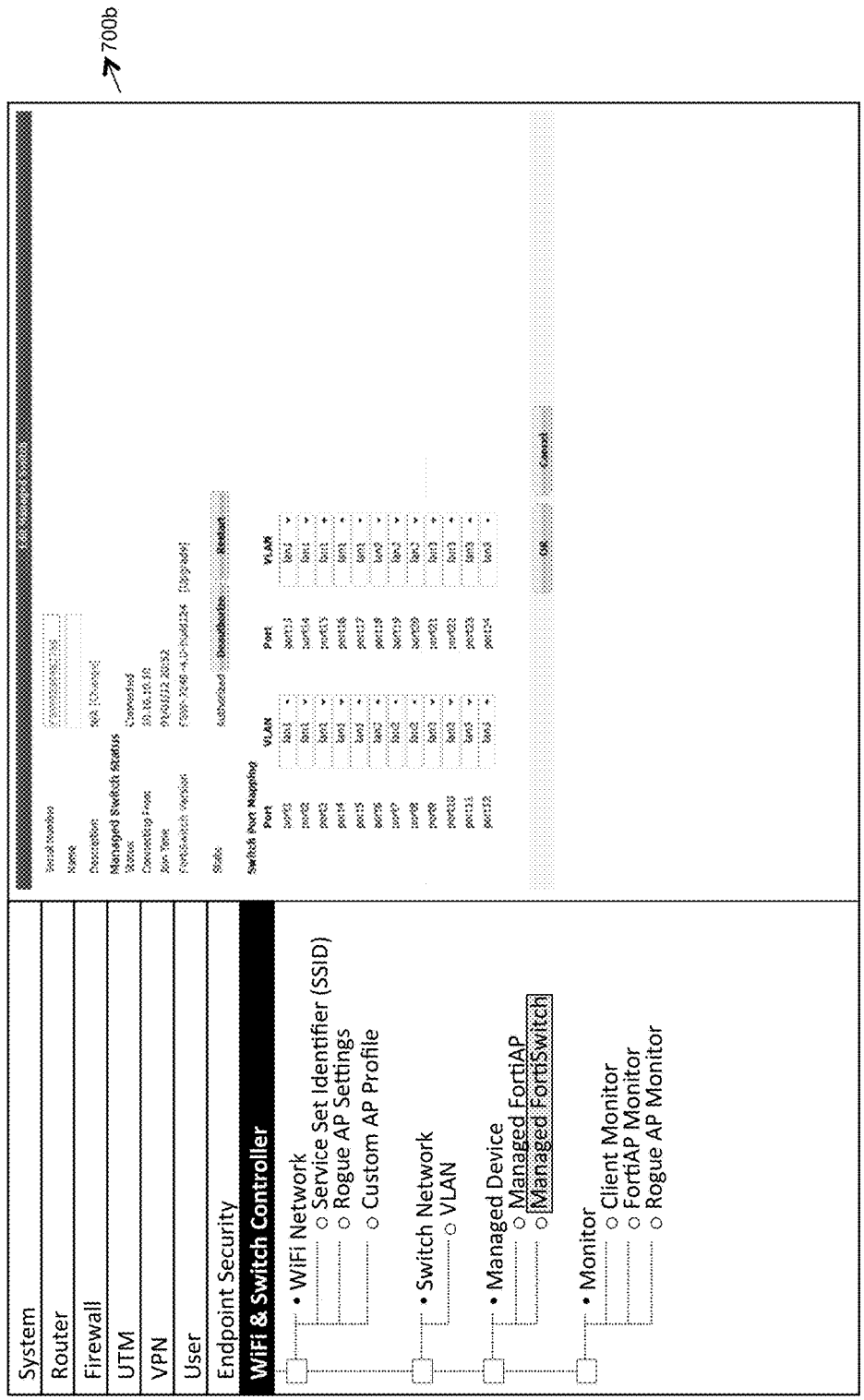
Figure 7D:
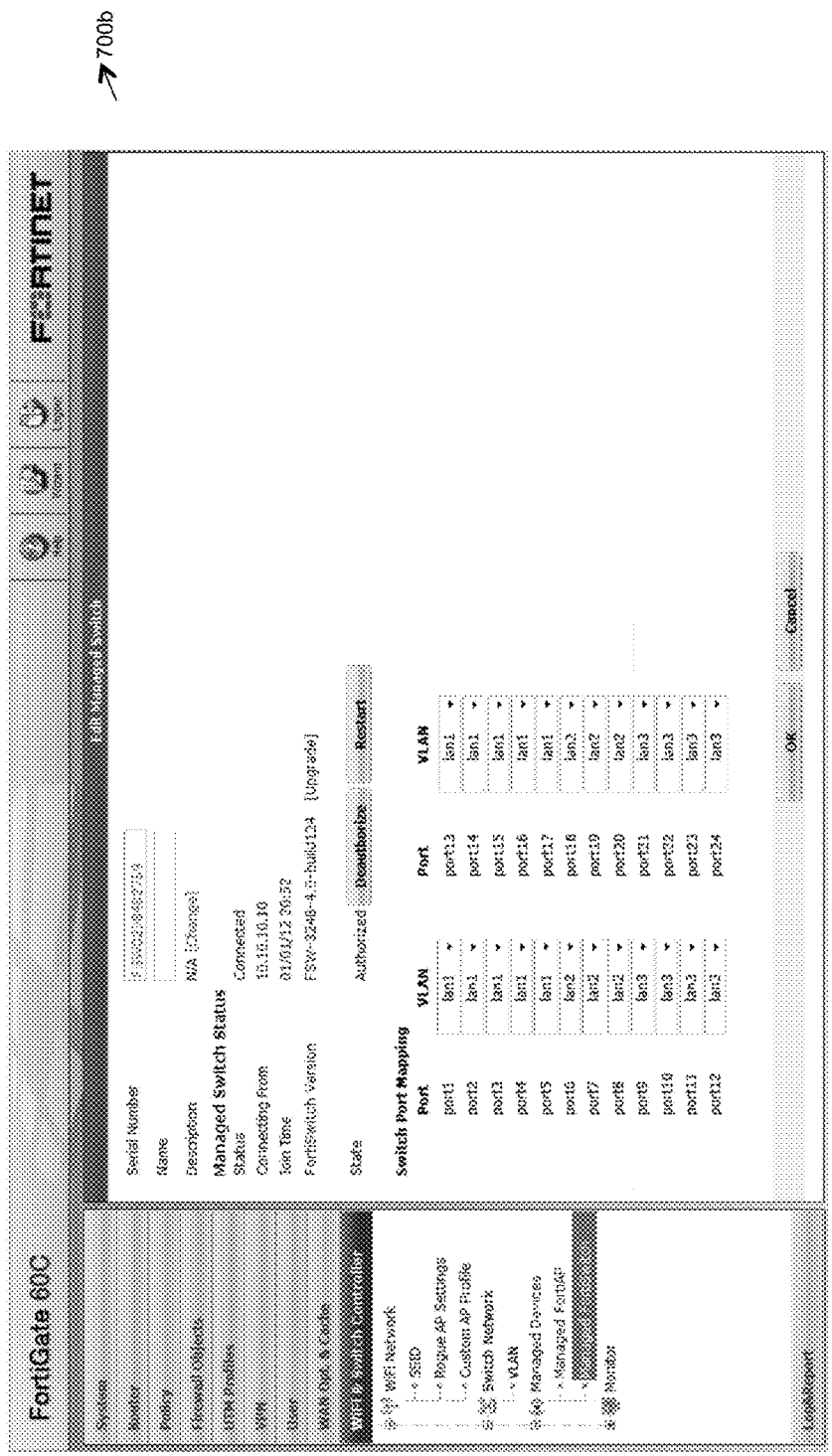

FIGS. 7C and 7D illustrate an interface 700b to edit the parameters of the selected network switch. Interface 700b comprises editable fields in which the values may be changed. In an embodiment, the editable fields are Serial Number, Name and Description. The switch firmware may be updated by selecting the "upgrade" button. Further, in an embodiment, interface 700b includes a VLAN assignment table 702 that allows an administrator to change the port to VLAN mapping.

In an embodiment, the CLI syntax for configuring ports and trunks through the remote management system is as follows:

```
Config Switch-controller managed-switch
    Edit [SN]
        Set Name [text]
        Set Description [text]
        Config ports
        Edit [port-name]
            Set STP [Enable/Disable]
            Set flow-control [Enable/Disable]
            Set default-VLAN [VLAN-name]
            Set state [Up/Down]
            Set MTU [integer]
        End
        Config trunks
        Edit [trunk-name]
            Set STP [Enable/Disable]
            Set flow-control [Enable/Disable]
            Set default-VLAN [VLAN-name]
            Set state [Up/Down]
            Set MTU [integer]
            Set member [port-names]
        End
```

Figure 8:
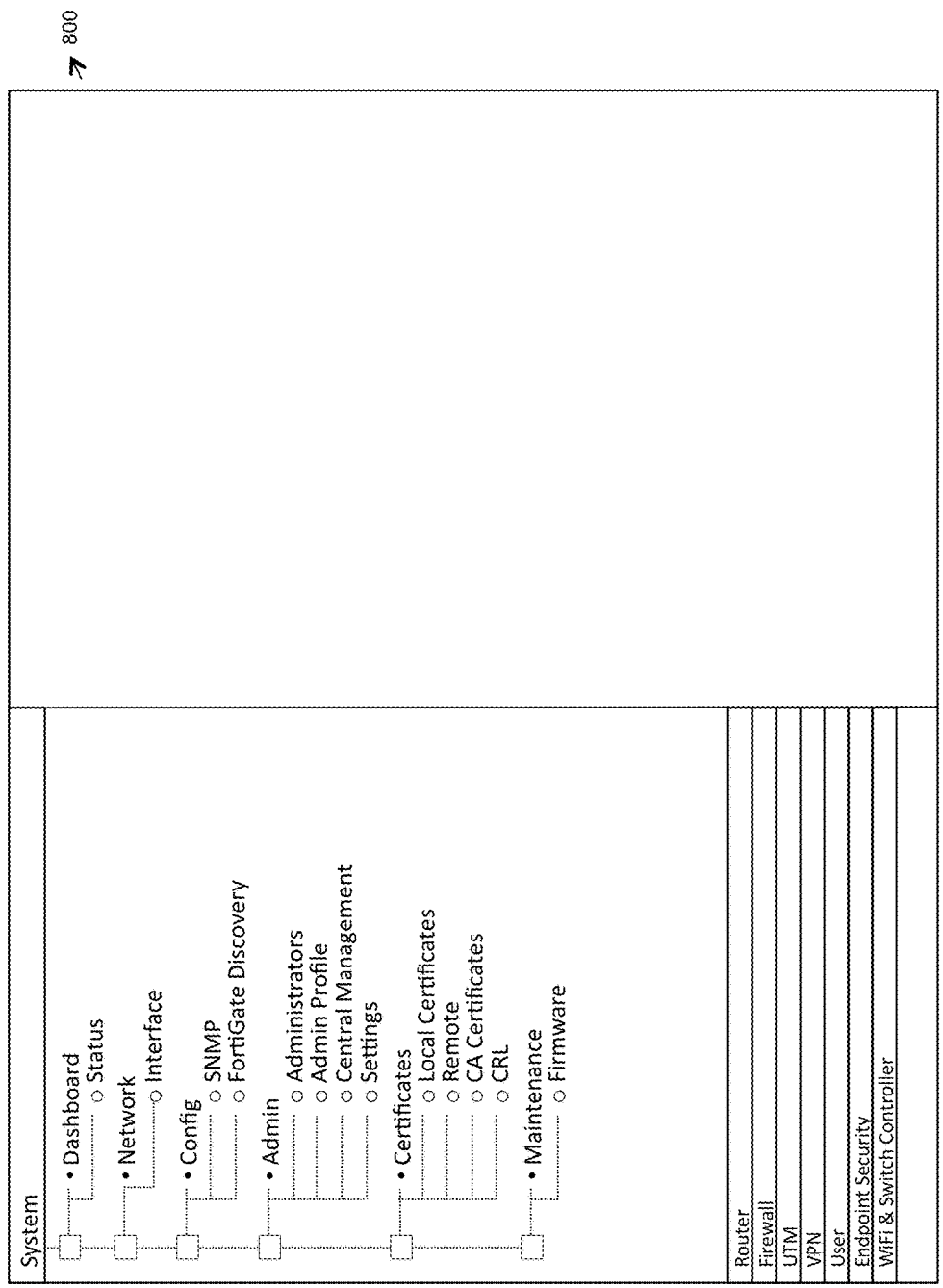
FIG. 8 shows an expanded menu layout of System tab of a remote management system in accordance with an embodiment of the present invention.

FIG. 8 shows an expanded menu layout of a System tab of a remote management switch system, such as GUI 800, in accordance with an embodiment of the present invention. System comprises sub-levels and their further branches. In an embodiment, as shown in FIG. 8, the menu layout of the System tab is as follows (the indentation represents sub-levels of the parent branch):

System
  Dashboard
  Status
  Network
  Interface
  Configuration
  SNMP
  FortiGate Discovery
  Admin
  Administrators
  Admin Profile
  Central Management
  Settings
  Certificates
  Local Certificates
  Remote
  CA Certificates
  CRL
  Maintenance
  Firmware It will be apparent to a person ordinarily skilled in the art that the above menu layout is just exemplary and modifications may be done, without deviating from the scope of the invention.

Figure 9:
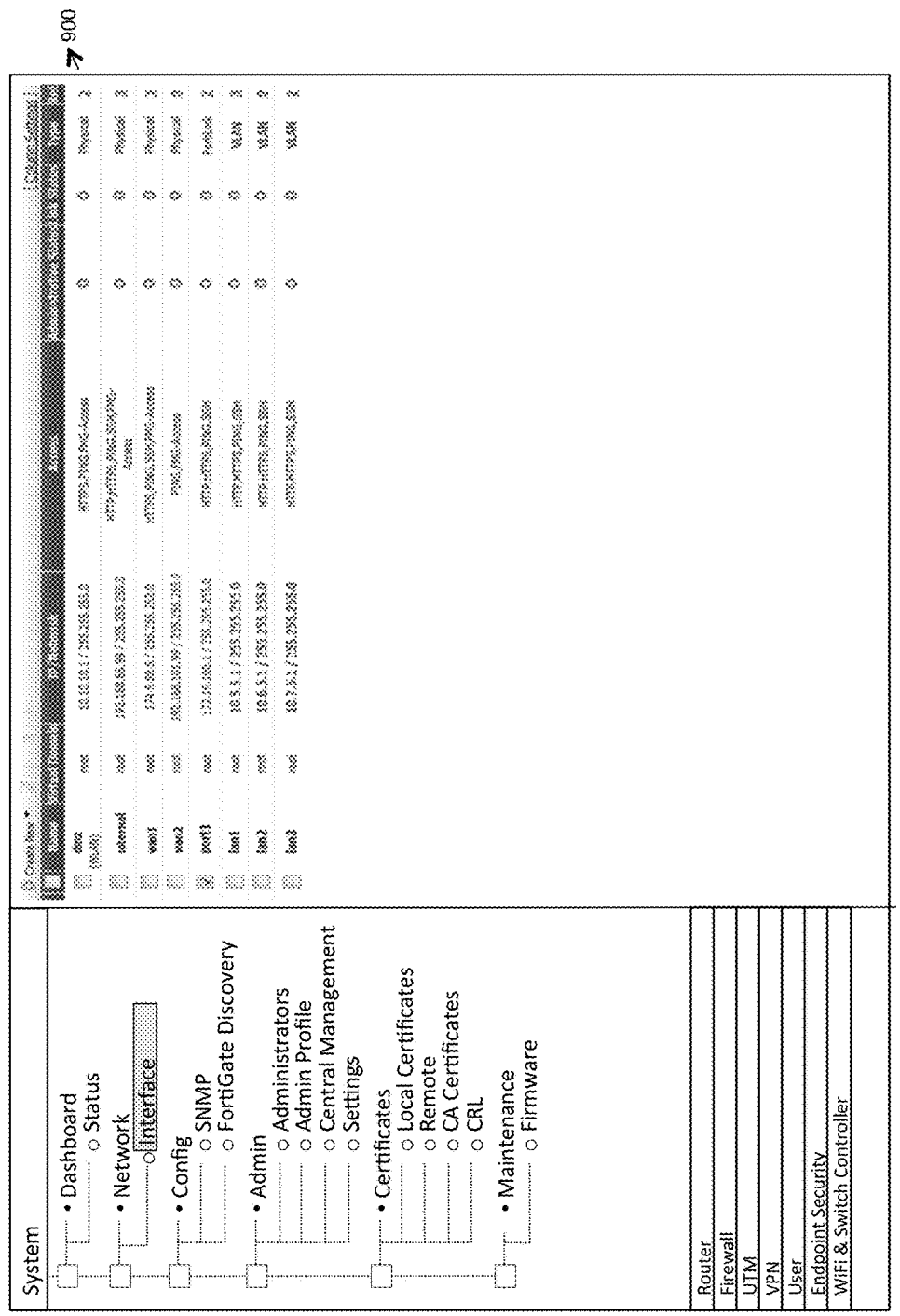
FIG. 9 illustrates an interface for managing ports of a switch system according to an embodiment of the present invention.

FIG. 9 illustrates an interface, such as GUI 900, for managing ports of a system according to an embodiment of the present invention. GUI 900 comprises a table summarizing the ports connected in the system and their various configuration parameters such as Name, Domain, Link Status, Description, and Administrative Status.

Figure 10:
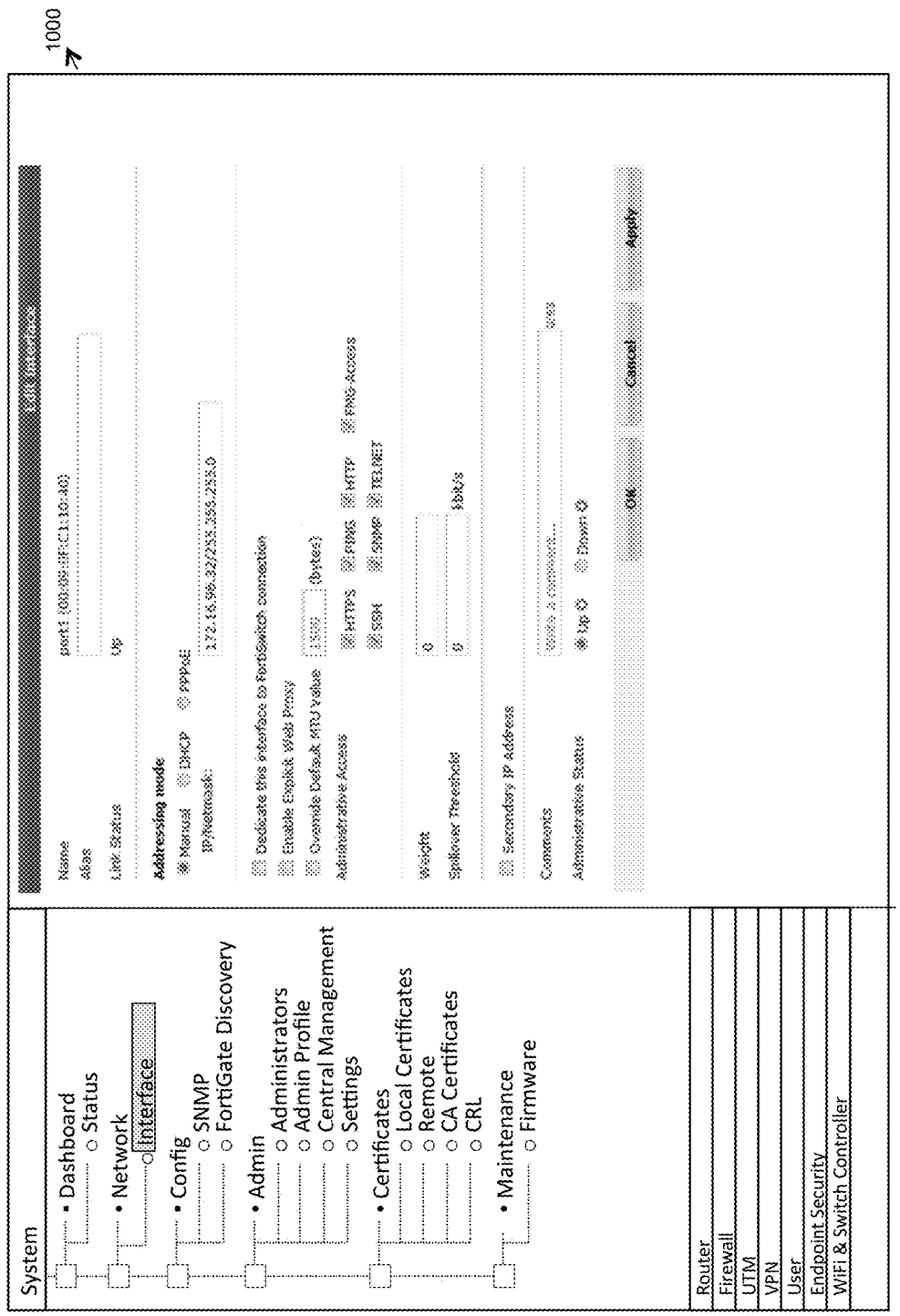
FIG. 10 illustrates an interface for managing interfaces of a switch system according to an embodiment of the present invention.

FIG. 10 illustrates an interface, such as GUI 1000, for managing interfaces of a system according to an embodiment of the present invention. GUI 1000 comprises a table summarizing the interfaces of the system and their various configuration parameters such as Name, Address Mode, IP Address, Allow access (HTTP/HTTPS/SSH/TELNET/PING/SNMP).

Figure 11:
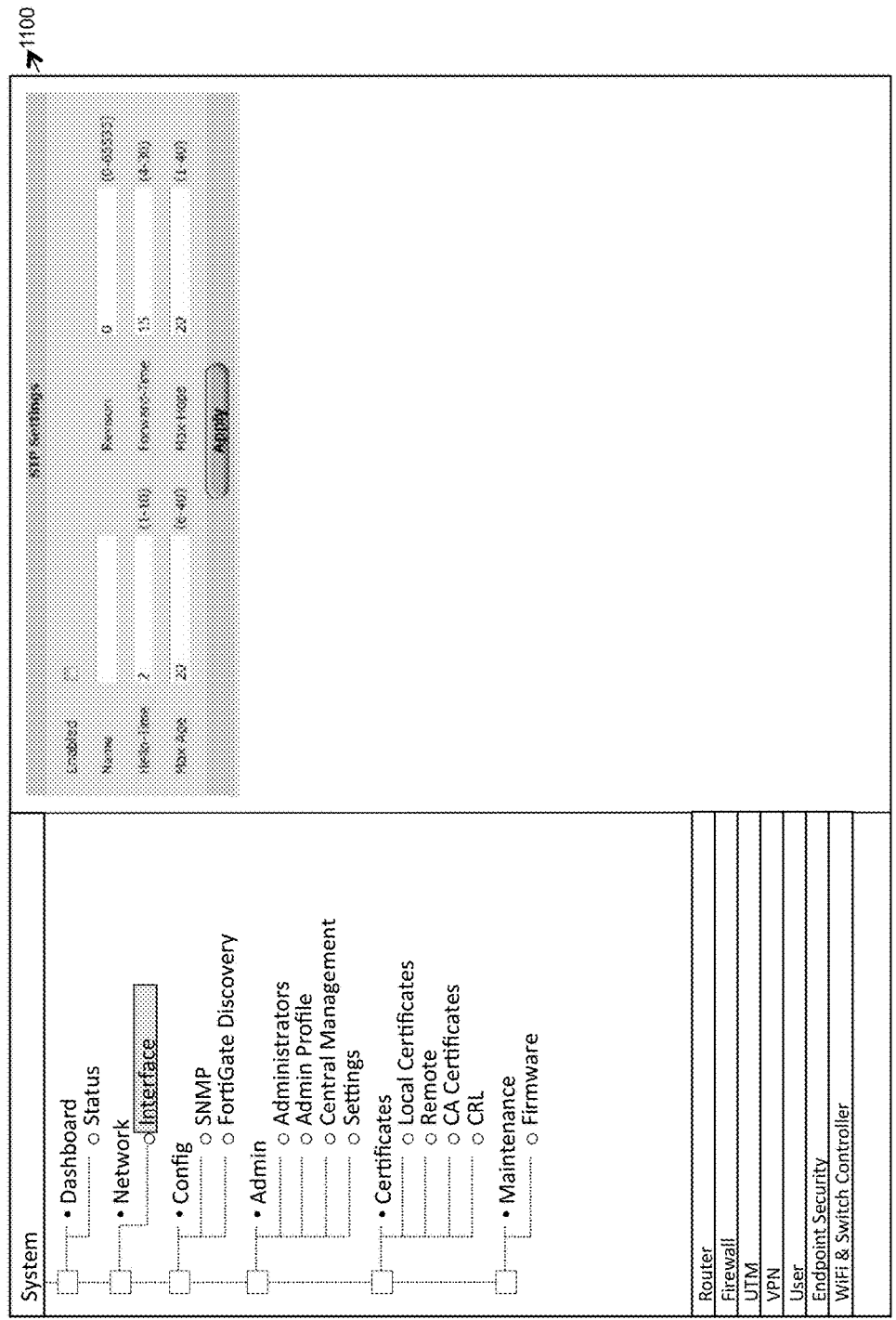
FIG. 11 illustrates an interface for managing Spanning Tree Protocol (STP) settings of a switch system according to an embodiment of the present invention.

FIG. 11 illustrates an interface, such as GUI 1100, for managing STP settings of a system according to an embodiment of the present invention. GUI 1100 presents editable fields to configure various STP parameters such as Name, Revision, Hello-Time, Forward-Time, Max-Age, and Max-Hops.

Figure 12:
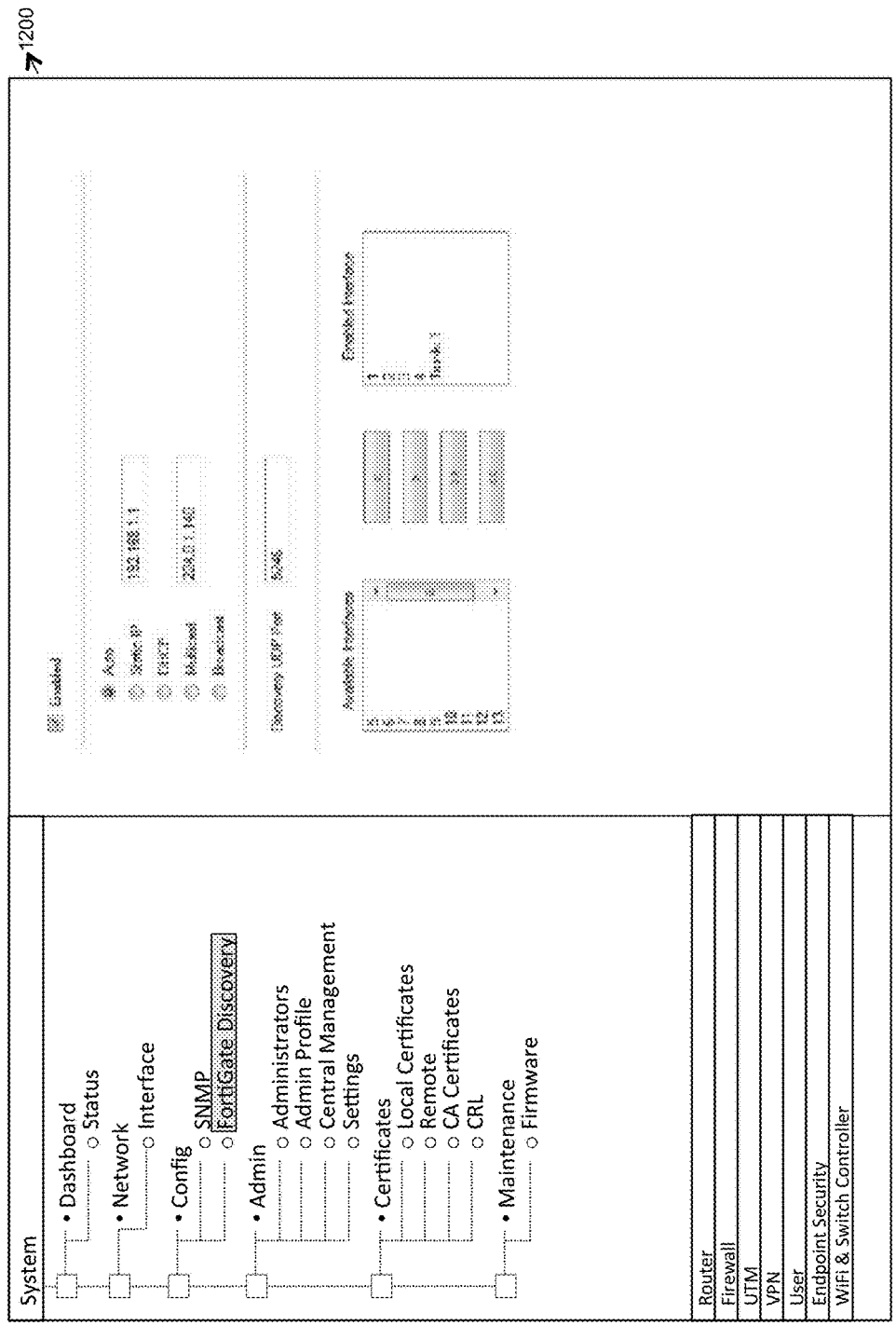
FIG. 12 shows an interface for firewall security device discovery by a network switch in accordance with an embodiment of the present invention.

FIG. 12 shows an interface 1200 for firewall security device discovery by a network switch, in accordance with an embodiment of the present invention. A network switch, such as switch 106 may use one or more of the broadcast, multicast, static IP or DHCP methods described above to locate an available firewall security device.

As noted above the discovery methods may utilize CAPUTP, CAPWAP or similar protocols for discovery. CAPUTP and CAPWAP are standard, interoperable protocols that enable a controller to manage a collection of termination access points, and uses UDP ports 5246 and 5247.

In an embodiment, once discovery is completed using the CAPUTP, CAPWAP or similar protocol, the network switch and the firewall security device initialize a CAPUTP, CAPWAP or similar command channel for remote control operations. In an embodiment, CAPUTP provides an encrypted master-slave command channel where the firewall security device issues remote commands directly to the network switch. The network switch then processes the command and/or delivers any requested information back to the firewall security device.

With continued reference to FIG. 12, interface 1200 shows the firewall security device discovery options to be utilized. In an embodiment, a user may select between Auto, Static IP, DHCP, Multicast, and Broadcast methods to locate an available firewall security device. When the network switch is in an auto mode, then the switch may utilize any one of the remaining four methods to send a discovery request. In such a case, the switch determines the domains of the connected network devices and sends a request accordingly. Further, in an embodiment, interface 1200 also contains an option to select the interfaces through which data packets/requests could be sent. The selected interfaces are listed under 'Enabled Interfaces' in FIG. 12.

The CLI syntax to enable the firewall security device discovery and control it remotely may be as follows:

```
Config system firewall security device-discovery
    Admin-mode [Enabled | Disabled*]
    Method
        Auto*
        Static-IP [Unicast-address]
        DHCP
        Multicast [224.0.1.140* | Multicast-
        address]
        Broadcast
    Enabled-ports
        Edit "Interface"
        End
    UDP-port [5246* | port-number]
```

The "*" above indicates the currently active mode of the system.

It will be apparent to a person ordinarily skilled in the art that the values/modes stated in the CLI syntax above are just exemplary and the user may enable different values.

In an embodiment, if the admin-mode is disabled the network switch does not attempt to discover a firewall security device. In another embodiment, with the admin-mode disabled, if a firewall security device tries to connect with the network switch, all connections/requests are ignored by the network switch.

Figure 13:
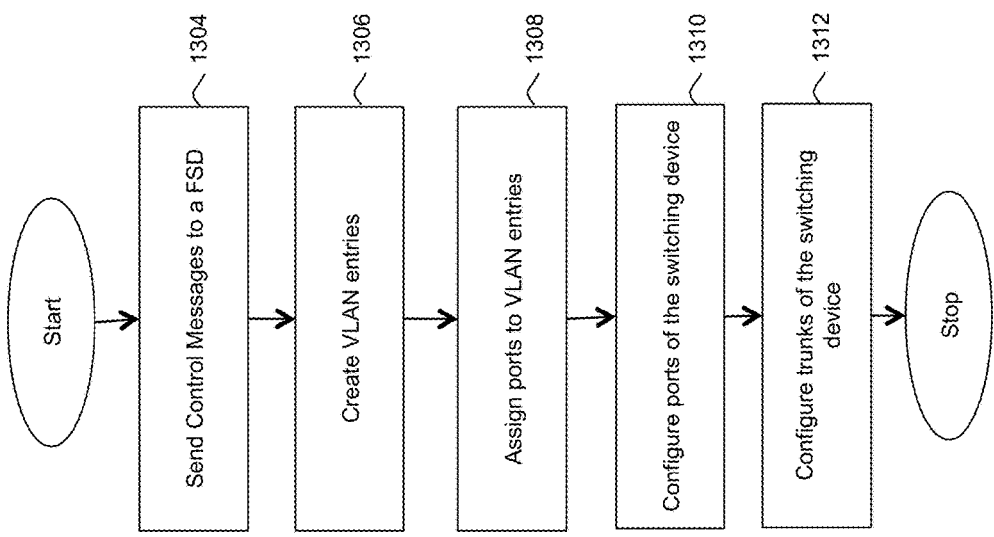
FIG. 13 is a flow diagram illustrating a method for configuring a switching device in accordance with an embodiment of the present invention.

FIG. 13 is a flow diagram illustrating a method for configuring a switching device, such as switch 106, in accordance with an embodiment of the present invention. Depending upon the particular implementation, the various process and decision blocks described below may be performed by hardware components, embodied in machine-executable instructions, which may be used to cause a general-purpose or special-purpose processor programmed with the instructions to perform the steps, or the steps may be performed by a combination of hardware, software, firmware and/or involvement of human participation/interaction.

At block 1304, a switch sends one or more control messages to a newly installed firewall security device. In response to the reception of these control messages, the firewall security device and the switch establish a command channel through which the switch can be remotely controlled/configured.

After the command channel is set up, the firewall security device sends the configuration of a switch port to the switch to allow traffic to go through the switch back to the security firewall device or go to another switch port. In one embodiment, if authentication or ACL are needed, related information is passed to the switch host CPU, which sends a related authentication request to firewall security device or determines whether to block or allow the traffic.

At block 1308, ports are assigned to VLAN devices created at block 1306. Each VLAN device denoted by a VLAN Identifier (ID) is assigned one or more of the ports 306 of the switch 106. A user may assign the VLAN to the switch 106 and select the port that uses this VLAN as default VLAN (PVID). In another embodiment, the user may also select general tagged and untagged member settings. At block 1310, ports of the switch are configured. Various port parameters such as STP mode, flow control, default VLAN, MTU, and administrative status may also be configured. At block 1312, trunk parameters such as STP mode, flow control, default VLAN, MTU, and administrative status of switch 106 are configured.

Figure 14:
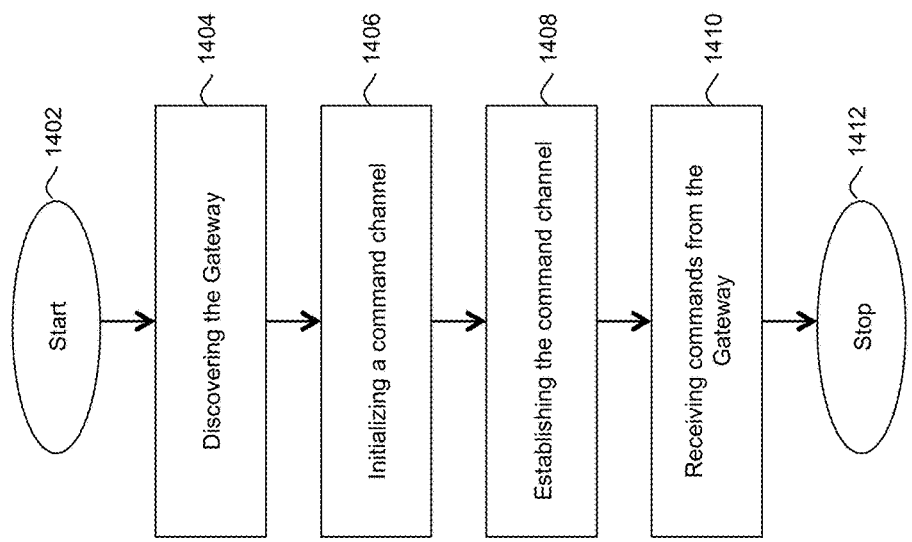
FIG. 14 is a flow diagram illustrating a method for automatic discovery of a firewall security device by a switching device in accordance with an embodiment of the present invention.

FIG. 14 is a flow diagram illustrating a method for automatic discovery of a firewall security device by a switching device in accordance with an embodiment of the present invention. The method initiates at block 1402. At block 1404, the switching device discovers the firewall security device through one of a broadcast method, a multicast method, a static IP method, or a DHCP method (as explained above). When the discovery is complete, the processing continues with block 1406. At block 1406, switch 106 and firewall security device 104 initialize a command channel for remote control operations. In an embodiment the switch 106 and the firewall security device 104 initialize a CAPUTP, CAPWAP or similar channel. At block 1406, the command channel is established, wherein CAPUTP, CAPWAP or the like provides an encrypted master-slave command channel.

At block 1410, switch 106 receives commands directly from firewall security device 104. Switch 106 then processes the commands and delivers any requested information back to the firewall security device 104. The method then terminates at 1412.

Figure 15:
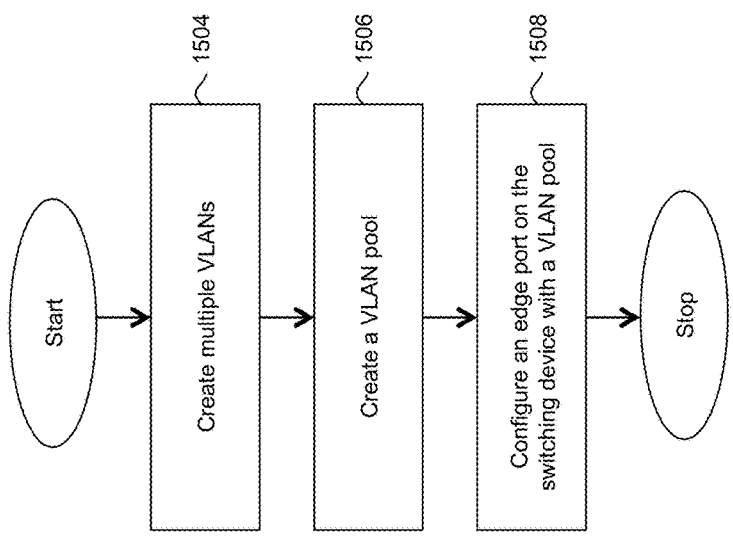
FIG. 15 is a flow diagram illustrating automatic VLAN configuration processing in accordance with an embodiment of the present invention.

FIG. 15 is a flow diagram illustrating automatic VLAN configuration processing in accordance with an embodiment of the present invention. At block 1504, multiple VLANs are created by firewall security devices in the network 100. At block 1506, an administrator creates a VLAN pool in the form of a set of mutually exclusive VLANs that each provides a specific pre-defined behavior. In an embodiment, when the VLAN is created, the administrator defines a security policy for the VLAN. The security policies govern the type of traffic allowed among and out of the VLANs. In an embodiment, a security policy is represented as a combined set of routing and firewall/UTM rules.

At block 1508, a port, such as port 306b, on the switch 106 is configured as an edge port with a VLAN selected from the VLAN pool. In an embodiment, an edge port is a switch port that is not connected to another switch device. The edge ports transition directly to the forwarding state. When the edge port is configured, the firewall security device scans each VLAN for a reachable VLAN list. In an embodiment, after scanning, the firewall security device makes routing table updates for source and destination VLANs, and also applies firewall/UTM policies to respective source and destination VLANs. This allows for a full automatic configuration for devices connected between switch 106 and the firewall security device.

Figure 16:
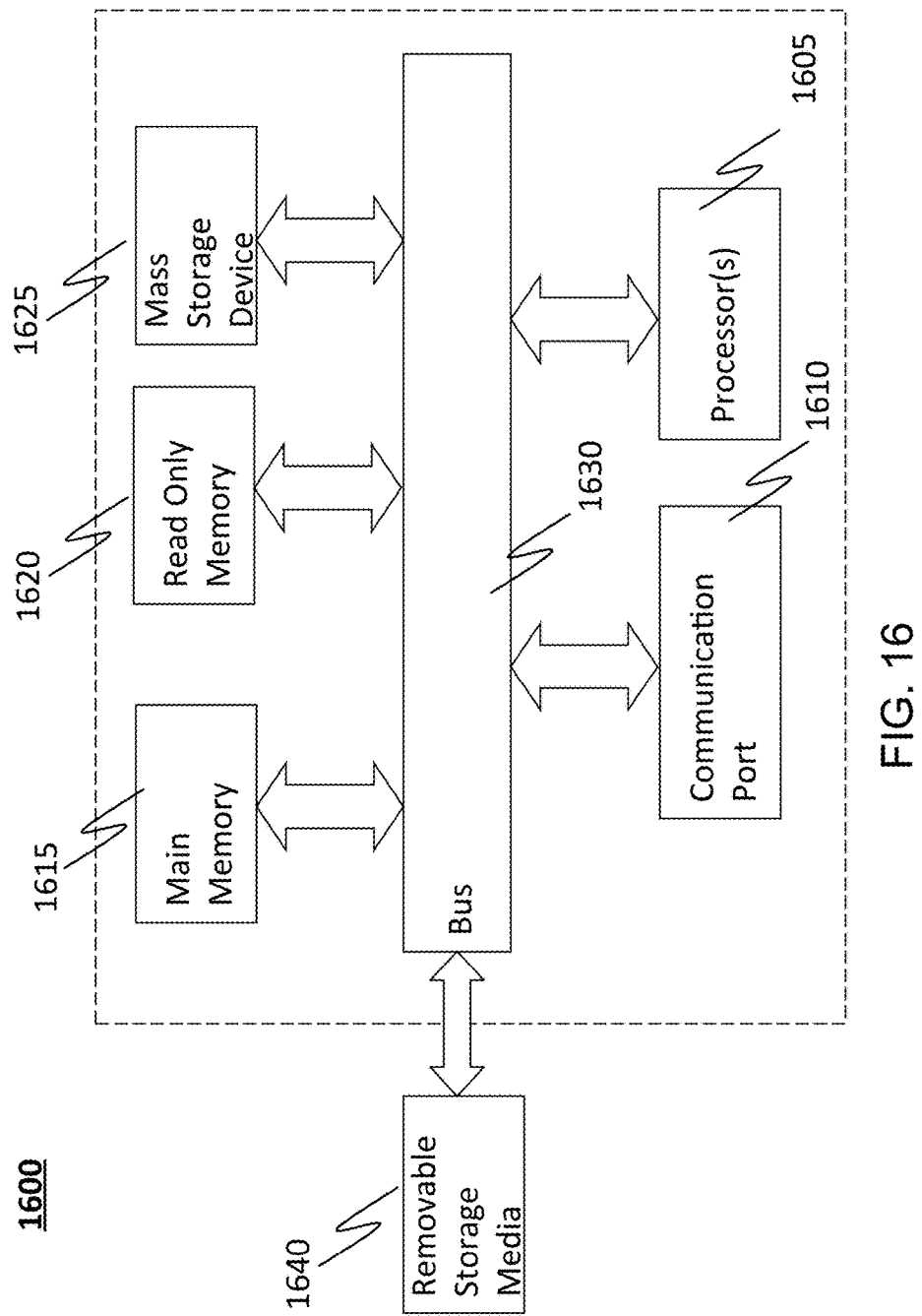
FIG. 16 is an example of a computer system with which embodiments of the present invention may be utilized.

FIG. 16 is an exemplary computer system in which or with which embodiments of the present invention may be utilized. Embodiments of the present invention include various steps, which have been described above. A variety of these steps may be performed by hardware components or may be tangibly embodied on a computer-readable storage medium in the form of machine-executable instructions, which may be used to cause a general-purpose or special-purpose processor programmed with instructions to perform these steps. Alternatively, the steps may be performed by a combination of hardware, software, and/or firmware. As such, FIG. 16 is an example of a computer system 1600, such as a network switch or the like, upon which or with which embodiments of the present invention may be employed.

According to the present example, the computer system includes a bus 1630, one or more processors 1605, one or more communication ports 1610, a main memory 1615, a removable storage media 1640, a read only memory 1620 and a mass storage 1625.

Processor(s) 1605 can be any future or existing processor, including, but not limited to, an Intel® Itanium® or Itanium 2 processor(s), or AMD® Opteron® or Athlon MP® processor(s), or Motorola® lines of processors. Communication port(s) 1610 can be any of an RS-232 port for use with a modem based dialup connection, a 10/100 Ethernet port, a Gigabit port using copper or fiber or other existing or future ports. Communication port(s) 1610 may be chosen depending on a network, such a Local Area Network (LAN), Wide Area Network (WAN), or any network to which the computer system 1600 connects.

Main memory 1615 can be Random Access Memory (RAM), or any other dynamic storage device(s) commonly known in the art. Read only memory 1620 can be any static storage device(s) such as Programmable Read Only Memory (PROM) chips for storing static information such as start-up or BIOS instructions for processor 1605.

Mass storage 1625 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), such as those available from Seagate (e.g., the Seagate Barracuda 7200 family) or Hitachi (e.g., the Hitachi Deskstar 7K1000), one or more optical discs, Redundant Array of Independent Disks (RAID) storage, such as an array of disks (e.g., SATA arrays), available from various vendors including Dot Hill Systems Corp., LaCie, Nexsan Technologies, Inc. and Enhance Technology, Inc.

Bus 1630 communicatively couples processor(s) 1605 with the other memory, storage and communication blocks. Bus 1630 can include a bus, such as a Peripheral Component Interconnect (PCI)/PCI Extended (PCI-X), Small Computer System Interface (SCSI), USB or the like, for connecting expansion cards, drives and other subsystems as well as other buses, such a front side bus (FSB), which connects the processor(s) 1605 to system memory.

Optionally, operator and administrative interfaces, such as a display, keyboard, and a cursor control device, may also be coupled to bus 1630 to support direct operator interaction with computer system 1600. Other operator and administrative interfaces can be provided through network connections connected through communication ports 1610.

Removable storage media 1640 can be any kind of external hard-drives, floppy drives, IOMEGA® Zip Drives, Compact Disc—Read Only Memory (CD-ROM), Compact Disc—Re-Writable (CD-RW), Digital Video Disk—Read Only Memory (DVD-ROM).

Components described above are meant only to exemplify various possibilities. In no way should the aforementioned exemplary computer system limit the scope of the invention.

While embodiments of the present invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claims.

What is claimed is:

1. A method comprising:
   automatically determining, by a discovery module of a switching device within a network, existence of a firewall security device within the network;
   upon determining the existence of the firewall security device, dynamically establishing, by a communication module of the switching device, a command channel between the switching device and the firewall security device through which the firewall security device issues remote commands to the switching device relating to configuration of one or more Virtual Local Area Networks (VLANs), wherein the command channel comprises an encrypted command channel; and
   receiving, by the switching device via the command channel, a command issued by the firewall security device to assign a port of a plurality of ports of the switch to a VLAN of the one or more VLANs as specified by an administrator of the network via a graphical user interface of the firewall security device, wherein the command includes a VLAN name and a VLAN ID; and
   configuring, by the switching device, the port in accordance with the command.

2. The method of claim 1, further comprising one or more of:
   configuring one or more ports of the plurality of ports of the switching device responsive to a first set of one or more commands received by the switching device through the command channel from the firewall security device;
   configuring one or more trunks of a plurality of trunks of the switching device responsive to a second set of one or more commands received by the switching device through the command channel from the firewall security device; and
   setting the one or more ports as tagged members or untagged members of the one or more VLANs responsive to a third set of one or more commands received by the switching device through the command channel from the firewall security device.

3. The method of claim 1, wherein the automatically determining comprises:
   broadcasting, by the discovery module, a discovery request message onto the network; and
   receiving, by the discovery module, a discovery response message in the form of a unicast message originated by the firewall security device responsive to the discovery request message.

4. The method of claim 1, wherein the automatically determining comprises:
   multicasting, by the discovery module, a discovery request message onto the network; and
   receiving, by the discovery module, a discovery response message in the form of a unicast message originated by the firewall security device responsive to the discovery request message.

5. The method of claim 1, wherein the automatically determining comprises:
   receiving, by the discovery module, an Internet protocol (IP) address of the firewall security device;
   sending, by the discovery module, a unicast discovery request message onto the network directed to the IP address; and
   receiving, by the discovery module, a discovery response message in the form of a unicast message originated by the firewall security device responsive to the unicast discovery request message.

6. The method of claim 5, wherein the IP address is received via the control channel.

7. The method of claim 5, wherein the IP address is received from a Dynamic Host Configuration Protocol (DHCP) server.

8. The method of claim 2, wherein said configuring one or more ports comprises setting at least one parameter from a group comprising a Spanning Tree Protocol (STP), a flow control, a default VLAN, an operational state, and a Maximum Transmission Unit (MTU).

9. The method of claim 2, wherein said configuring one or more trunks comprises setting at least one parameter from a group comprising a Spanning Tree Protocol (STP), a flow control, a default VLAN, an operational state, and a Maximum Transmission Unit (MTU).

10. The method of claim 2, further comprising allowing an administrator to define a VLAN pool in the form of a set of mutually exclusive VLANs that each provide a specific pre-defined behavior.

11. The method of claim 1, wherein the command channel uses a Control and Provisioning of Wireless Access Points (CAPWAP) protocol.

12. A method comprising:
automatically determining, by a discovery module of a switching device within a network, existence of a firewall security device within the network;
upon determining the existence of the firewall security device, dynamically establishing, by a communication module of the switching device, a command channel between the switching device and the firewall security device through which the firewall security device remotely controls various Virtual Local Area Network (VLAN) configuration settings of the switching device, wherein the command channel comprises an encrypted command channel; and
receiving, by the switching device via the command channel, a command issued by the firewall security device to perform VLAN auto pool configuration processing, wherein the command identifies an edge port of a plurality of ports of the switch to be assigned to a VLAN within a VLAN pool as specified by an administrator of the network via a graphical user interface (GUI) of the firewall security device, wherein the VLAN pool is created by the administrator via the GUI and includes a set of mutually exclusive VLANs each associated with a pre-defined security policy; and
performing, by the switching device, the VLAN auto pool configuration processing, including assigning the edge port to the VLAN and assigning a port of the plurality of ports associated with the command channel to the VLAN.

13. The method of claim 12, further comprising one or more of:
configuring one or more ports of the plurality of ports of the switching device responsive to a first set of one or more commands received by the switching device through the command channel from the firewall security device;
configuring one or more trunks of a plurality of trunks of the switching device responsive to a second set of one or more commands received by the switching device through the command channel from the firewall security device; and
setting the one or more ports as tagged members or untagged members of the VLAN responsive to a third set of one or more commands received by the switching device through the command channel from the firewall security device.

14. The method of claim 12, wherein the automatically determining comprises:
broadcasting, by the discovery module, a discovery request message onto the network; and
receiving, by the discovery module, a discovery response message in the form of a unicast message originated by the firewall security device responsive to the discovery request message.

15. The method of claim 12, wherein the automatically determining comprises:
multicasting, by the discovery module, a discovery request message onto the network; and
receiving, by the discovery module, a discovery response message in the form of a unicast message originated by the firewall security device responsive to the discovery request message.

16. The method of claim 12, wherein the automatically determining comprises:
receiving, by the discovery module, an Internet protocol (IP) address of the firewall security device;
sending, by the discovery module, a unicast discovery request message onto the network directed to the IP address; and
receiving, by the discovery module, a discovery response message in the form of a unicast message originated by the firewall security device responsive to the unicast discovery request message.

17. The method of claim 16, wherein the IP address is received via the control channel.

18. The method of claim 16, wherein the IP address is received from a Dynamic Host Configuration Protocol (DHCP) server.

19. The method of claim 13, wherein said configuring one or more ports comprises setting at least one parameter from a group comprising a Spanning Tree Protocol (STP), a flow control, a default VLAN, an operational state, and a Maximum Transmission Unit (MTU).

20. The method of claim 13, wherein said configuring one or more trunks comprises setting at least one parameter from a group comprising a Spanning Tree Protocol (STP), a flow control, a default VLAN, an operational state, and a Maximum Transmission Unit (MTU).

* * * * *